US008352423B2

(12) United States Patent
Phillips et al.

(10) Patent No.: US 8,352,423 B2
(45) Date of Patent: Jan. 8, 2013

(54) APPARATUS AND METHOD FOR PROVIDING STREAMING DATA

(75) Inventors: Mark Phillips, San Jose, CA (US);
Jonathan Cook, San Jose, CA (US);
Matthew Leonard Bateman, Mill Creek, CA (US); Vijay Sadanand Ghaskadvi, San Jose, CA (US); Ruchita Vijay Ghaskadvi, San Jose, CA (US); Aniruddha Ashok Deswandikar, Santa Clara, CA (US); Sunil Sudhakar Dasanagadde, Santa Clara, CA (US)

(73) Assignee: Inceptia LLC, Brooklyn, NY (US)

( * ) Notice: Subject to any disclaimer, the term of this patent is extended or adjusted under 35 U.S.C. 154(b) by 0 days.

(21) Appl. No.: 10/841,216

(22) Filed: May 7, 2004

(65) Prior Publication Data

US 2006/0004802 A1      Jan. 5, 2006

(51) Int. Cl.
*G06F 7/00* (2006.01)
*G06F 17/30* (2006.01)

(52) U.S. Cl. ........................................ 707/610; 707/613

(58) Field of Classification Search .................. 707/100, 707/1, 2, 101, 610, 613; 705/7; 349/44; 709/328, 315, 206, 231, 318
See application file for complete search history.

(56) References Cited

U.S. PATENT DOCUMENTS

| | | | | |
|---|---|---|---|---|
| 6,006,227 A | * | 12/1999 | Freeman et al. | 707/695 |
| 2002/0024622 A1 | * | 2/2002 | Murade | 349/44 |
| 2002/0052769 A1 | * | 5/2002 | Navani et al. | 705/7 |
| 2002/0078259 A1 | * | 6/2002 | Wendorf et al. | 709/328 |
| 2002/0174262 A1 | * | 11/2002 | Marcos et al. | 709/315 |
| 2003/0145096 A1 | * | 7/2003 | Breiter et al. | 709/231 |
| 2003/0149727 A1 | * | 8/2003 | Jaschek et al. | 709/206 |
| 2004/0049481 A1 | * | 3/2004 | Blevins | 707/1 |
| 2004/0085927 A1 | * | 5/2004 | Yannay et al. | 370/329 |

OTHER PUBLICATIONS

Tony Andrews, et al., Specification: Business Process Execution Language for Services Version 1.1 May 5, 2003. http://www-106.ibm.com/developerworks/library/ws-bpel/.
Erik Christensen, et al., Web Services Description Language (WSDL) Mar. 15, 2001. http://www.w3.org/TR/wsdl.
Noah Mendlesohn, Soap Message Transmission Optimization Mechanism, Feb. 9, 2004. http://www.w3.org/TR/2004/WD-soap12-mtom-20040209/.
David Both, et al., Web Services Architecture, Feb. 11, 2004. http://www.w3.org/TR/2004/NOTE-ws-arch-20040211/.

\* cited by examiner

*Primary Examiner* — Christyann Pulliam
*Assistant Examiner* — Fariborz Khoshnoodi

(57) ABSTRACT

A Java based server is disclosed for providing streaming data. Streaming data is received in a publisher interface and processed to generate Java messages describing real time updated. One application of the Java based server is to provide streaming data for business process.

2 Claims, 22 Drawing Sheets

APPARATUS AND METHOD FOR PROVIDING STREAMING DATA

FIELD OF THE INVENTION

The present invention relates to the accessing of structured and unstructured data, such as data from disparate source. In particular, the present invention is directed towards accessing data from disparate sources using a web services orchestration platform.

BACKGROUND OF THE INVENTION

There is an increasing interest in software applications to improve the ability of user to find, extract, and manipulate data from various electronic documents. Such software applications are also sometimes known as integration applications.

There are three main classes of integration applications. A first class of integration application is an enterprise application integration (EAI) solution that is designed to handle complex data integration problems at a high data throughput. Such EAI solutions are provided from a variety of vendors but have the drawback that they typically require a significant amount of expertise and training to use. A second class of integration application is application specific, such as integration applications prepared for a specific company that are designed to fix a specific integration problem. A drawback of this class of integration application is that they cannot be easily modified or maintained. Finally a third class of integration application is designed to permit integration solutions to be developed quickly and easily modified. This third class of integration application may, for example, require less integration or have lower data throughput than an EAI solution designed for more complex integration problems.

Recently, web services have become of interest for automating business processes. Web services are defined, for example, in the world wide web consortium (W3C) "Web services architecture working group Note 11 of 11 Feb. 2004," the contents of which are hereby incorporated by reference. Web services is a technology that includes software interfaces to describe an operation to execute or exchange data with another web service. Web services provide loosely coupled integration of services. This provides the basis for very open and extensible service oriented architecture (SOA), allowing new components and services to be quickly deployed. A web service includes, for example, a listener to receive a message, a proxy to take the message and translate it into an action to be carried out, and the application code to implement the action. The Microsoft Corporation of Redmond, Wash., has a .NET™ development platform that supports web services on the Windows® platform.

The web services definition language (WSDL) is a grammar for defining a web service proposed by W3C. WSDL is described in the W3C Note "Web Services Definition Language (WSDL) 1.1," the contents of which are hereby incorporated by reference. WSDL is an XML format for describing network services as a set of endpoints operating on messages containing either document-oriented or procedure-oriented information. A WSDL document uses the following elements in the definition of network services: Types, a container for data type definitions; message, an abstract definition of the data being communicated; operation, an abstract description of an action supported by the service; port type, an abstract set of operations supported by one or more endpoints; binding, a concrete protocol and data format specification for a particular port type; port, a single endpoint defined as a combination of a binding and a network address; and a service, a collection of related endpoints. WSDL also includes several binding extensions, including the simple object access protocol (SOAP) hypertext transport protocol (HTTP) extension, which is described in the W3C note "simple object access protocol (SOAP) 1.1" the contents of which are hereby incorporated by reference. SOAP permits, for example, HTTP messages to be used to create a web service that is an application that responds to requests to a SOAP message via a HTTP server or a Java servlet.

Recently, IBM and Microsoft have proposed a business process execution language for web services (BPEL4WS) that permits a variety of business processes to be automated using web service interfaces. "Business Process Execution Language For Web Services Version 1.0" is published on-line at the Web sites of IBM and Microsoft (e.g., at http:www-106.ibm.com/developerworks/library/ws-bpel as of the filing date of the present application) and is hereby incorporated by reference in its entirety. BPEL4WS provides a language for the formal specification of business processes and business partners. BPEL includes business protocols that use process descriptions for business protocols. A BPEL document defines a process as a set of activities. These activities include invocation of components or other web services, but can also contain program control constructs including while, switch, etc. BPEL4WS declaratively define processes in XML. BPEL4WS defines a partner as the services that a process will interact with. A business process communicates with its partners by invoking operations on them by passing messages. BPEL4WS defines a message as a container if the message type is supported by the web service. Correlation sets define message/container properties that represent correlated data between two partners. BPEL4WS provides a rich process description notation with many features reminiscent of an executable language. In addition, the language is built around web services to achieve universal interoperability between applications using web standards. BBPEL4WS is layered on top of several XML specifications, including WSDL 1.1. For example, a BPEL4WS process represents all partners and interactions in terms of abstract WSDL interfaces.

However, there are several drawbacks to using web services in integration applications. One drawback is that BPEL processes can become burdensome to program, understand, and debug for even medium complexity processes. Another drawback is that while web services and BPEL automate certain types of web processes, some desired data sources may be from non-web sources. Still another drawback to using web services in integration applications is creating processes that are intended to be efficiently stored and run on an enterprise server on a regular basis.

Therefore, what is desired is an integration application apparatus, system, and method that provides both a platform and server where applications that can be easily and quickly developed and deployed using web services.

SUMMARY OF THE INVENTION

A Java based server is disclosed for providing streaming data. Streaming data is received in a publisher interface and processed to generate Java messages describing real time updates. One application of the Java based server is to provide streaming data for business process.

One embodiment of a method of generating real time data includes receiving streaming data in a publisher interface. The streaming data is processed to generate Java messages describing real time data updates. Java messages are provided to at least one subscriber.

One embodiment of a server includes a process engine to process streaming data; a Java messaging service; a publisher interface coupled to the Java messaging service for publishers to publish streaming data; and a subscriber interface coupled to the Java messaging service for subscribers to listen to streaming data.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
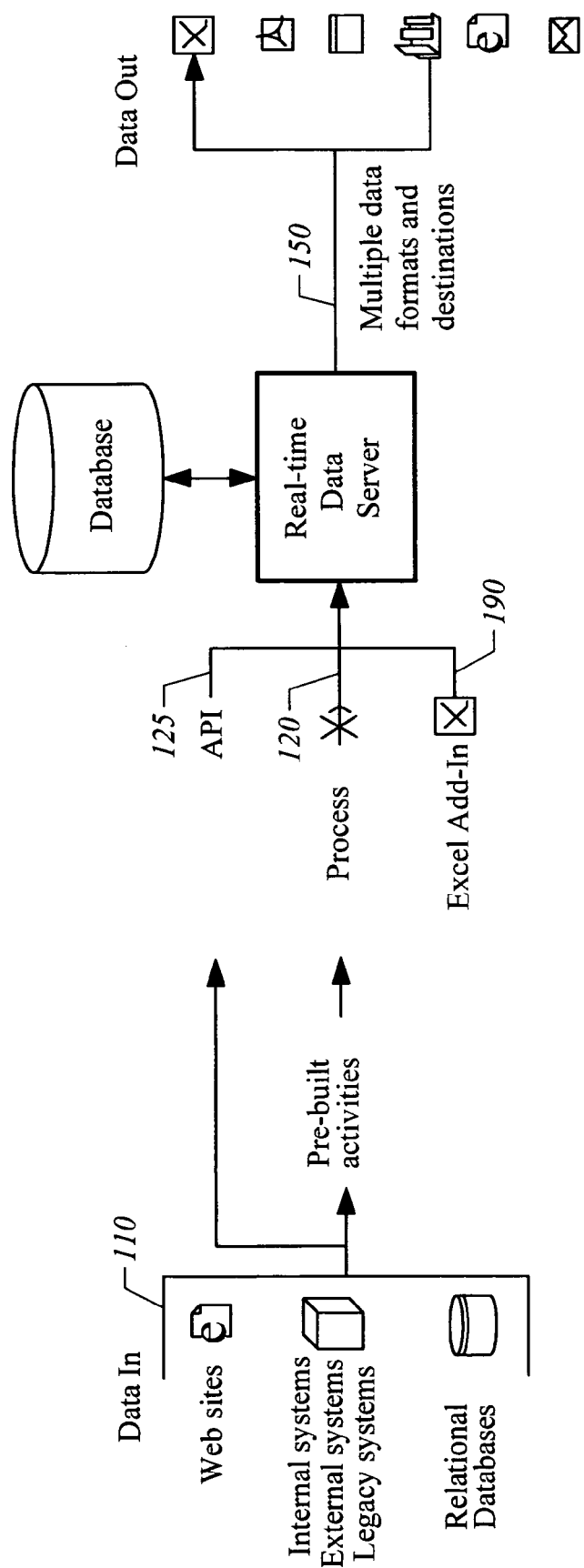
FIG. 1 is a diagram illustrating dataflow in a business process in accordance with one embodiment of the present invention.
Figure 2A:
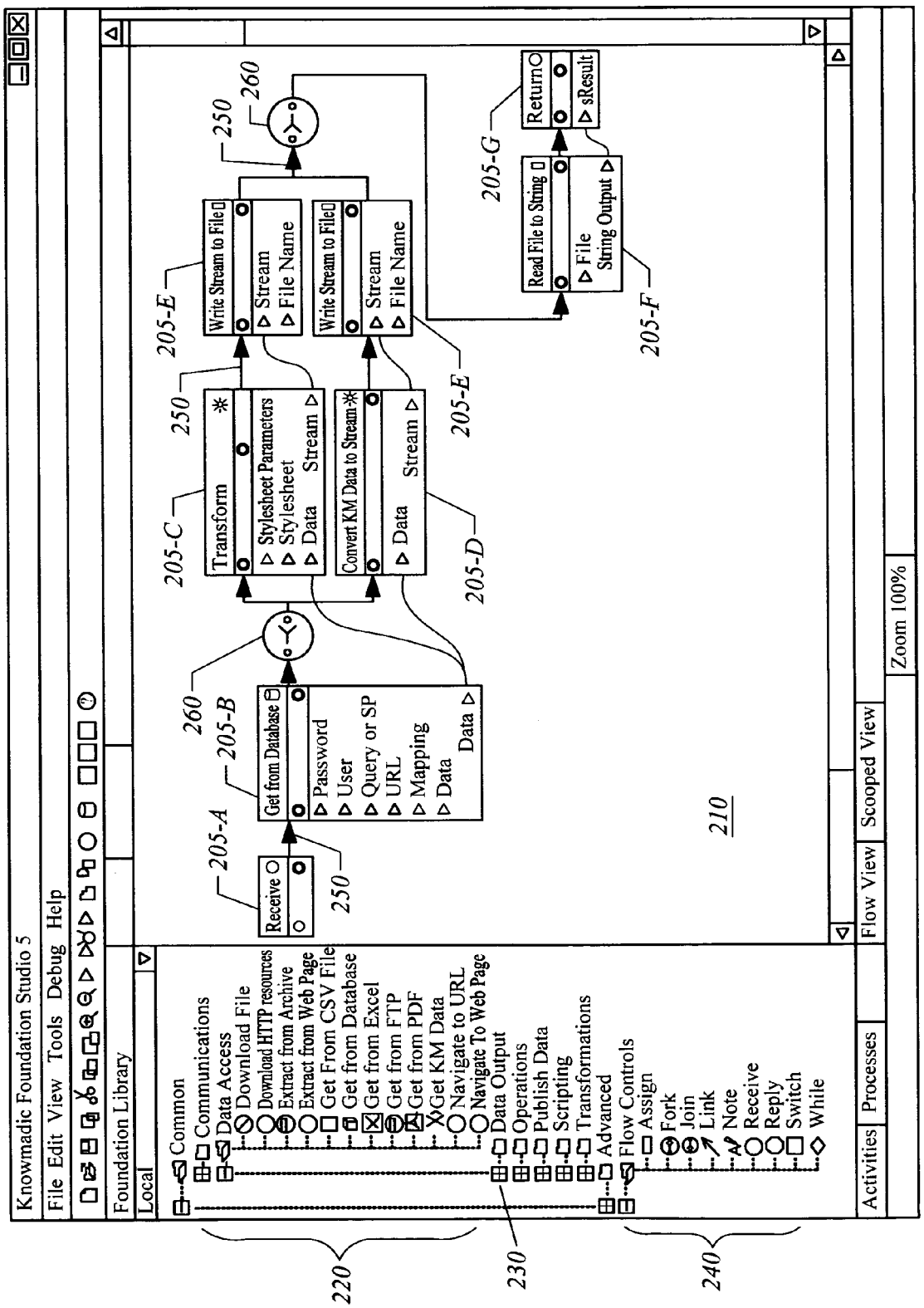
FIG. 2A is an exemplary screen shot of a flow canvas representation of a business process in accordance with one embodiment of the present invention.
Figure 2B:
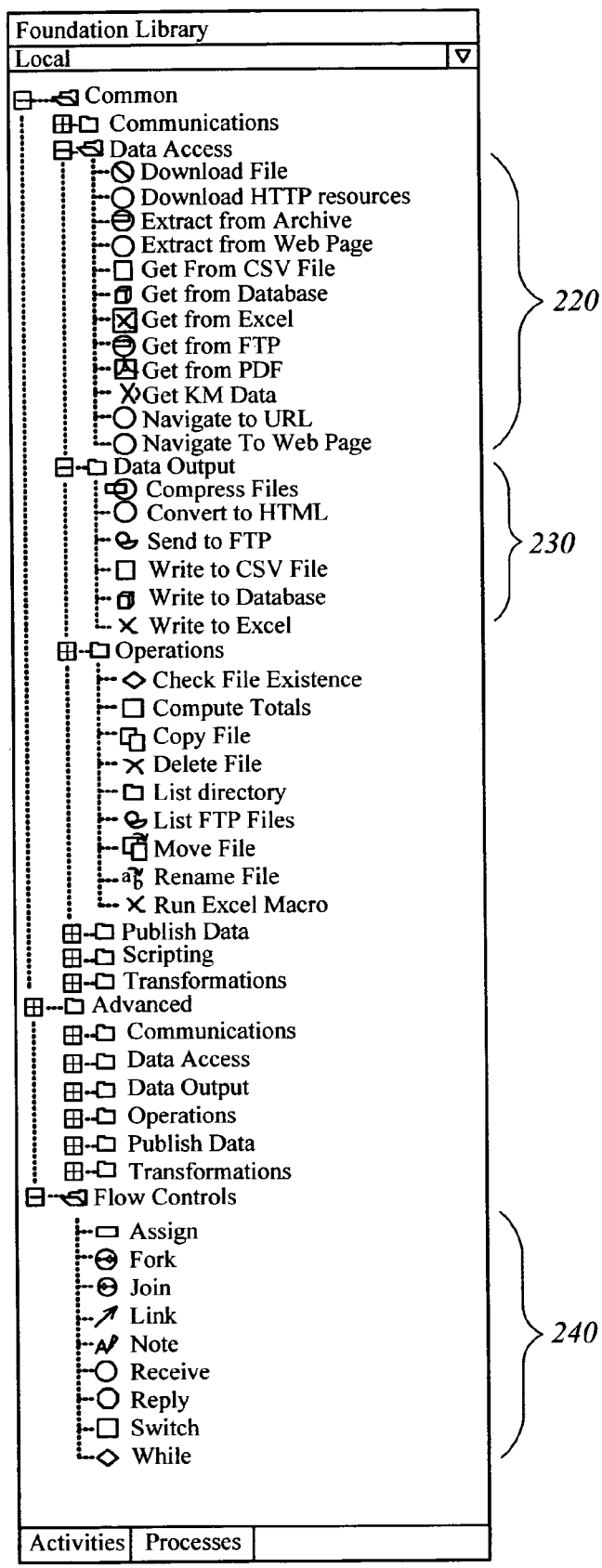
FIG. 2B illustrates in more detail a library of operations for the flow canvas of FIG. 2A.
Figure 3:
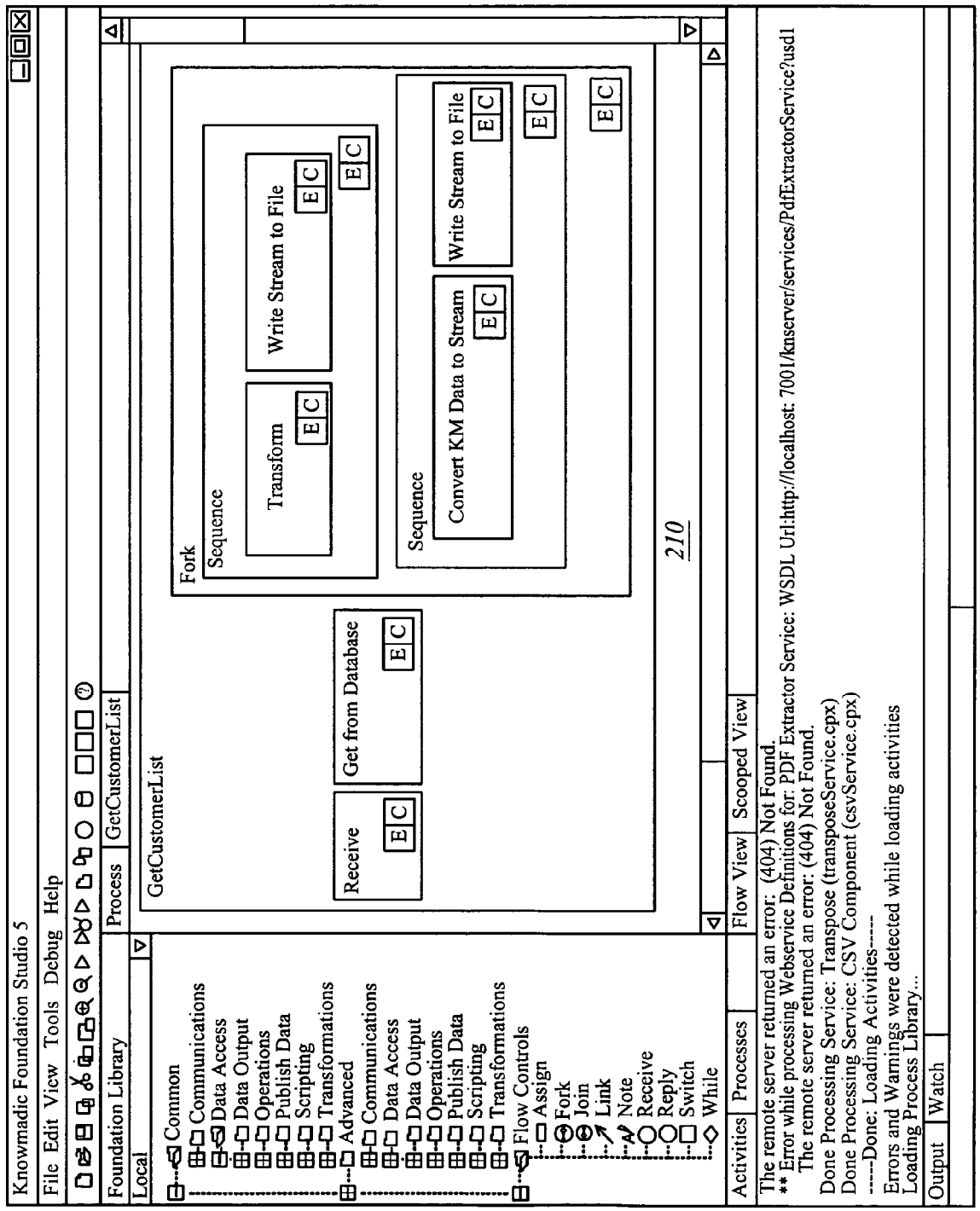
FIG. 3 is a scoped view of the flow canvas of FIG. 2A.

Some aspects of the problem solved by the present invention may be understood with regards to FIGS. 1-3. FIG. 1 is a high-level data flow diagram in accordance with one embodiment of the present invention. It is desired to create a business process 120 that may access and integrate data from a variety of sources 110, such as web sites, a variety of systems such as intranets and extranets, databases, or data feeds, which each may be in a variety of different formats. This may include identifying a data source and a subset of information of interest within the data source, such as a portion of information on a web page, intranet page, portable data file (PDF), Excel® document, Microsoft Word® document, other file format, or information of interest within a streaming data source. Data may also be transformed and operated upon to perform the business process 120. It will thus be understood that while a simple process may access only a single source of data, more generally an arbitrary number of data sources may be accessed for a particular business process.

The business process 120 has an associated application programming interface (API) 125 for accessing data. Whenever the process is executed, an on demand server 130 performs a business process on the input data sources 110 and publishes the data 150 to desired destinations in desired formats. In some embodiments, the data is published to an Excel spreadsheet or other data visualization tool. Alternately, published data may also be used in other business processes. An Excel® add-in 190 may be included to permit data to be published to Excel® documents.

The business process flow of the integration application is preferably handled by using an open standard compatible with web services, such as BPEL (business process execution language) and/or a rules engine. For example, there are a set BPEL operators, fork, join, switch, etc that can be used to modify the process flow between activities. In one embodiment custom activities (e.g., web services) are written in either Java or .NET™.

In one embodiment, a visualization platform having a flow canvas is provided so that an integration application can be constructed through a "drag and drop" approach. FIG. 2A illustrates a screen shot of a studio environment in which activities are visually represented on a graphical user interface as activity blocks 205 that are "dragged and dropped" onto a flow canvas 210. The flow canvas 210 facilitates a user designing a business process and also provides the additional benefit that computer code is not exposed.

FIG. 2B illustrates in more detail an exemplary menu of library operations for use with flow canvas 210. Data access interfaces 220 permit a user to select a source of data, such as selecting a portion of data from a HTTP resource, archive, web page, database, Excel® document, file transfer protocol (FTP), PDF, uniform resource locator (URL), or web page. Note that the data source can be from a variety of different sources and in different data formats. In some embodiments, the data may be extracted from an electronic document by scraping selected pieces of information from a target page using a target pattern, as described in U.S. patent application Ser. No. 09/465,028, entitled "Method of Providing Database Function For Multiple Internet Services," and U.S. patent application Ser. No. 09/715,424, entitled "System For Providing Database Functions For Multiple Internet Sources" the contents of each of which are hereby incorporated by reference. In one embodiment, data may be acquired from one or more streaming data sources. Data output interfaces 230 permit a user to select data destinations and formats, such as converting data to HTML format, compressing files, writing to comma separated values (CSV) files, writing to a database, or writing to Excel®. Flow control interfaces 240 permit a user to select flow controls, which in one embodiment are BEPL controls, such as BPEL4WS flow controls. On the flow canvas the activities will appear as a set of invocations linked together by the control constructs provided by BPEL, such as switch, while, etc, which are built-in flow controls. In addition, BPEL supports the concept of parallel vs. sequential flow.

In the exemplary process flow of FIG. 2A, the activity blocks 205 include a first block in which information is acquired from a database, which may require, for example, user information, a URL, a query, a password, mapping, or other information to acquire desired data. The activity blocks 205 are coupled by BPEL operator symbols 260 and arrows 250 indicating the process flow. Additional lines indicate the data flow. Exemplary activity blocks 205 illustrated in the exemplary screen shot of FIG. 2A include a receive block 205-A to receive a process, a database access block 205-B to access data sources, a transform block 205-C to transform a data format, a conversion block 205-D to convert data into a data stream, a write block 205-E to write data to a file, a read string 205-F to read a file to a string, and a return block 205-G to end the process.

Referring to FIG. 3, in one embodiment the same process may be viewed in a scoped view of the process. The scoped view permits, for example, a different visual representation of the same business process.

Figure 4:
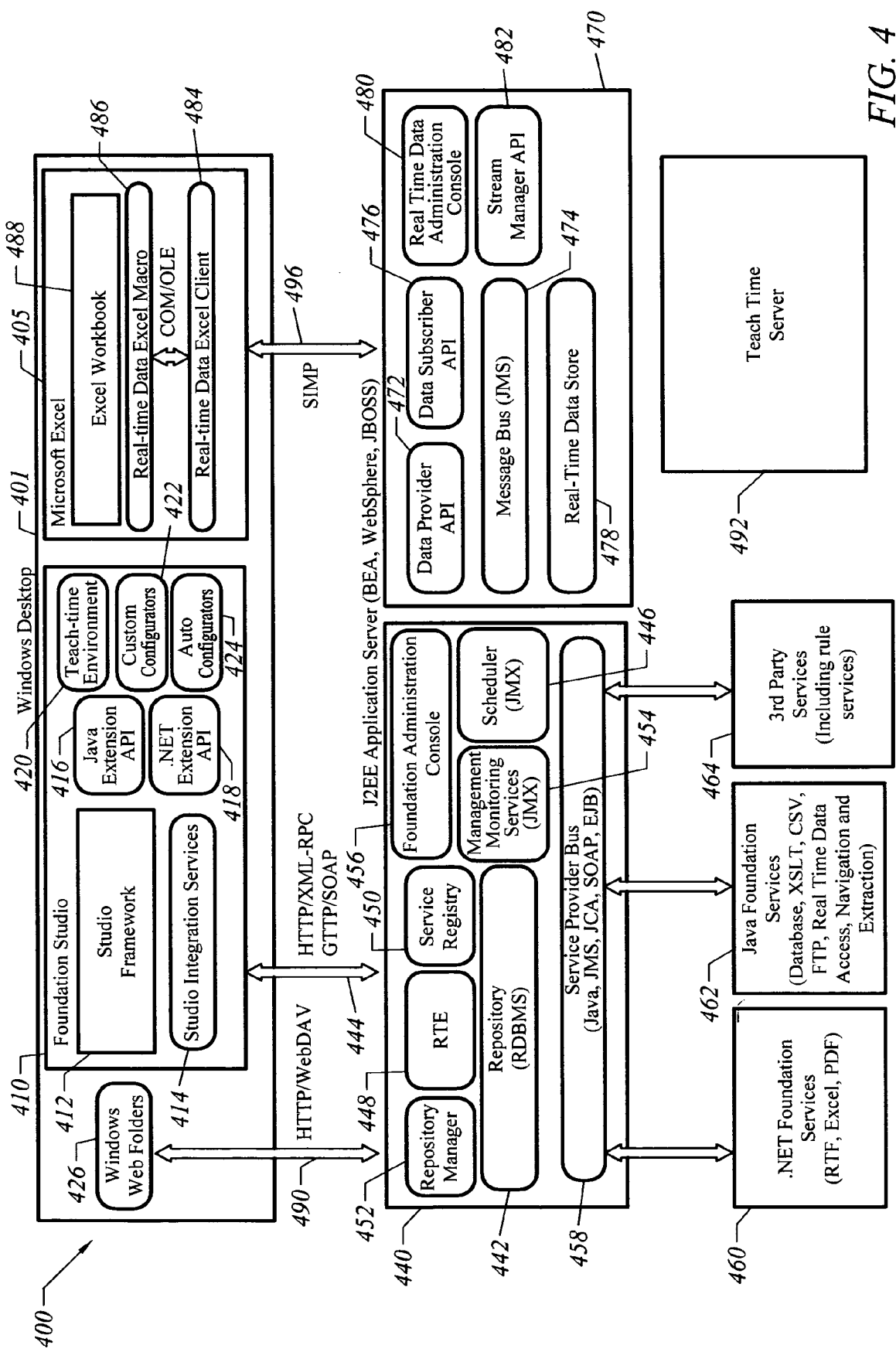
FIG. 4 illustrates an integration application system in accordance with one embodiment of the present invention.

FIG. 4 illustrates a system 400 for aggregating information in accordance with one embodiment of the present invention. In one embodiment, system 400 includes interfaces and features to be compliant with web services standards; a desktop platform 401, such as the Windows® platform compatible with .NET™ web services; and a high performance application server, such as a Java based server.

System 400 includes features to permit a user to create a flow canvas 210 representation of a BPEL process that may be executed on an application server. Each process consists of a BPEL document describing the flow and a WSDL document describing how to communicate with the process. Additionally, as described below in more detail, in some embodiments system 400 includes features to permit data from streaming data sources to be integrated, data to be scraped on demand from electronic documents, and includes features to permit data from a variety of sources and formats to be integrated.

A foundation studio 410 acts as a web services orchestration platform for a user to design and manage the execution of a business process that integrates data from at least one data source. Foundation studio 410 may be implemented as a software application residing on a computer readable medium that runs on a desktop platform 401 of a client computer (not shown). In one embodiment foundation studio 410 is compatible with the operating system of the Microsoft® corporation of Redmond Wash. and runs on a Microsoft Windows® desktop, permitting system 400 to take advantage of other features of Microsoft's® suite of software products, such as Microsoft's Excel® 405, Internet Explorer®, and .NET™® web services. However, it will be understood throughout the following discussion that foundation studio 410 may also be adapted to be compatible with other operating systems as well.

In one embodiment foundation studio 410 includes a studio framework 412 having a user interface for a user to generate processes that include at least one activity on a flow canvas 210, where an activity may include, for example, reading and writing data from a database, real-time data access, web scraping etc. Studio framework 412 is a main user interface that allows end-users to quickly and easily build applications using the activity set. The activity set is a set of web services functions. A number of activities with the associated data and process flow form a process. The studio framework 412 consists of a flow canvas (not shown in FIG. 4) for process layout and an activity palette (not shown in FIG. 4) for exposing activities that can be orchestrated.

Studio integration services 414 is a set of dynamic link libraries (DLL) assemblies that allow communication between the studio framework and other components of the system. They provide handling for XML based protocols that will be used to pass information at both development and deployment time. Java extension API 416 is a set of classes that allow custom configurators to be integrated into the foundation studio 410 using Java swing technology. .NET™ extension API 418 is a set of C# classes that allow custom configurators to be integrated into studio using a .NET™ supported language, such as C# and VB. Custom configurators 422 and auto configurators 424 are included to customize the foundation studio 410 for custom activities. Windows web folders 426 exposes a WebDAV compliant interface that can be connected using the "My Network Places" web folder functionality within Windows 2000® and Windows XP®. WebDAV, web distributed authoring and versioning, is an XML protocol that is used to provide content management to heterogeneous clients via HTTP. Web folders within the Windows® desktop can communicate with WebDAV servers allowing the repository 442 to be presented seamlessly to Windows® applications.

Once a process is ready for execution it can be deployed from the foundation studio 410 to the foundation server 440 for execution. Foundation server 440 is an on-demand application server compatible with web services. In one embodiment, foundation server 440 has an enterprise environment based on the Java programming language, such as a Java 2 platform enterprise edition (J2EE) environment within an application server. The J2EE environment bundles a variety of Java interfaces such as enterprise Java beans, Java servlets, remote method invocations, a Java messaging system, a Java naming and directory interface (JNDI), and Java management extensions.

Foundation Server 440 includes a process repository 442 for the activities of each process submitted to the foundation server, and the activity interfaces are described through XML. Repository 442 may be based on a relational database management system (RDBMS), such as an Oracle SQL Server 2000™ and DB2. It provides storage for the virtual file system, schedules, and process and activity service registry 450.

The interface between the foundation studio 410 and foundation server 440 for transmitting a description of a business process from foundation studio 410 to repository 442 is through a WebDAV compatible interface 444. In one embodiment the implementation of each activity of the process is through Java code residing in the application server. The application server gives the processes scalable, fault tolerant and reliant characteristics. The foundation server 440 also preferably includes a scheduling feature, using a web interface to allow processes to be run on a date/time basis. However, note that one aspect of describing a business process using BPEL is that the activities of a process can reside anywhere, in any language, as long as they can communicate via web services protocols. Consequently, it will be understood that in alternate embodiments the implementation of each activity of the process may be implemented in languages other than Java and reside in locations other than foundation server 440.

The runtime environment (RTE) 448 provides all the necessary features and services to enable the application to execute after deployment. As described below in more detail, in one embodiment RTE 448 includes an execution engine (not shown in FIG. 4). In one embodiment the runtime environment is based on Java and J2EE technologies and is platform and application server independent. RTE 448 is designed to execute business process flows that have been described within the studio in the form of an XML document, where in some embodiments the structure of this XML document is based on the BPEL4WS specification. Service registry 450 provides a service registration and lookup mechanism, similar to UDDI, to allow for processes and activities to be location independent.

Repository manager 452 provides integration between the activity and process libraries using the Windows® desktop environment. This allows for a simple user experience for deploying processes to the runtime. In one embodiment, the repository manager 452 is based on a customized version of the Apache slide project of the Apache Software Foundation. The Apache slide project is a WebDAV enabled collaborative content management system that allows files to be store in a virtual file system. The files within this file system can be stored in multiple data sources including flat-file and real time database management system (RDBMS).

Management and monitoring services 454 are a set of interfaces provided to allow external applications and monitoring tools to monitor and manage the run-time environment. These services allow management via web, simple network management protocol (SNMP) and Java management extension (JMX) clients. Foundation administration console 456 is a web application that provides access to the management and monitoring APIs, enabling a remote administrator to modify system parameters, logging levels, service registry entries and schedules. Scheduler 446 provides a mechanism for scheduling execution of processes that have been stored within the repository 442.

Service provider bus 458 is based on a web services invocation framework (WSIF) and provides a mechanism for dynamically invoking web services asynchronously from the process execution. WSIF is a Java API for invoking web services, no matter how or where the services are provided and can invoke any service described in WSDL. WSIF is available from the Apache Software Foundation. Note that in one embodiment service provider bus 458 can access services available using .NET™ services, Java services, and third party services. This permits, for example, accessing a variety of data services. .NET™ foundation services 460 are a set of web services that are written using .NET™ technologies and exposed using an internet information server (IIS), where IIS is a windows server for ASP, HTTP, XML, and .NET™. Exemplary services include web services written in .NET™ for interacting with rich text format (RTF), Excel, and portable document format (PDF) documents. Java foundation services 462 are a set of Java classes that are bound to the run-time using reflection via WSIF. Examples include data bases, eXtensible stylesheet language transformation (XSLT), comma separated value (CSV) files, file transfer protocol (FTP) files, real time data access, and navigation and extraction. $3^{rd}$ party services 464 consists of any web service that can be imported into the environment for execution within a process. Thus, server 440 may access not only .NET™ services but also Java services for accessing databases, files, real time data, and custom navigation and extraction, as will be described below in more detail. Additionally, server 440 may also access $3^{rd}$ party services. As result, the data sources may be more extensive than those that could be obtained using .NET™ services alone, permitting greater flexibility in designing a business process.

Teach time server 492 supports teach time environment 420. Teach time environment 420 is a custom configurator that enables web navigations and extractions to be created within the foundation studio 410. In one embodiment it utilizes Internet Explorer® for providing navigation and extraction recording, and a Java run-time environment for testing the recording for correct run-time operation. The navigation path may be to web page or, alternately, to a URL hosted on an intranet, extranet, or other type of network. After a navigation path and extraction are recorded, teach time server 492 may perform a user defined scraping of an electronic document. Teach time environment 420 and teach time server 492 thus permit, for example, a user to select a web page, intranet page, extranet page or other electronic document hosted on a network as a source from which information will be automatically extracted during run time execution of a business process.

In some embodiments, system 400 includes the capability to integrate streaming data from a variety of sources. For example, in a variety of industries streaming data is available from various sources on a variety of real time or quasi-real time data types. Real time data access server 470 provides the capability to stream live changing data, from the foundation server 440 and other providers, into a client such as open Excel documents. Data provider API 472 provides a Java API that enables data to be streamed into the real time data access message bus 474, stored and subsequently sent to any attached subscribers. Data subscriber API 476 provides a Java API that enables applications to subscribe to the real time data access message bus 474. Message bus (JMS) 474 is a set of JMS topics that allow data to be passed between the real time data access system components. Data store 478 is provided as a message driven EJB that stores streamed data into an RDBMS data repository. Administration console 480 provides a web interface for administrating streams and stream history. Stream manager API 482 is a Java API that provides a mechanism for creating/editing streams.

Note that a modification is made in desktop 401 to permit streaming data to be received by an Excel workbook 488 via a SMP interface 490. Real time data access Excel client 484 is a set of active templates library/common Object® model (ATL/COM) components that expose real time data access functionality to the Excel macro language VBA. Real time data access Excel macro 486 is an Excel macro that adds real time data access functionality to any active workbook.

System 400 includes a variety of features that facilitate a user to create a business process that may be run on a high performance server. Additionally, various features extend the range of services that can be provided and facilitate interoperability between different standards. Moreover, various features permit the aggregation of structured and unstructured data, such as data from disparate sources. These features will be described in more detail in the following sections.

I. Foundation Studio

Figure 5:
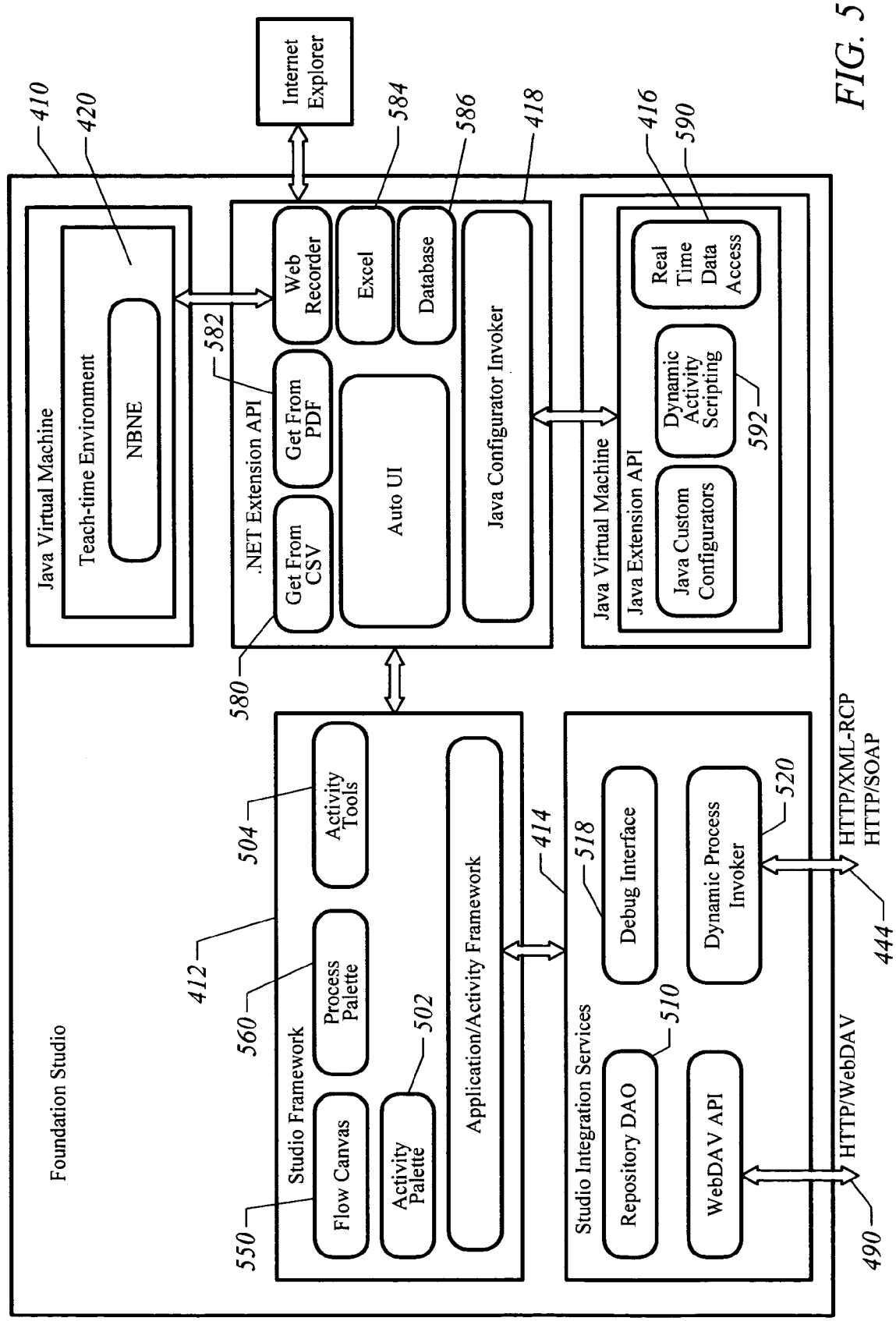
FIG. 5 illustrates a foundation studio in accordance with one embodiment of the present invention.

FIG. 5 shows in more detail submodules of an embodiment of the foundation studio 410. The foundation studio 410 supports generation of business processes using a declarative BPEL language, such as a declarative language based on the BPEL4WS specification. In one embodiment each activity of a business process is defined as a web service operation and has an associated WSDL (web service description language) definition file. The business process itself is also exposed as a web service and can be invoked using standard web methods.

In one embodiment, tight desktop integration is provided in the foundation architecture by providing a world wide web distributed authoring and versioning (WebDAV) interface 490 between the foundation studio 410 and the repository 442. This allows a copy of a portion of repository 442 to exist on desktop 401 in the form of web folders 426, such that the studio can save files directly to the repository. In addition, there is a capability to search for existing applications and activities within the repository.

Flow canvas 550 permits a business process to be designed. Processes authored within the foundation studio 410 generate a meta-data description file. Exemplary meta data include the process name, the process description, process layout information, object model defining the internal studio format defining how nodes within the process are related to each other, web service definition, such as the WSDL definition of a process that allows it to be called by external applications, and a flow definition which is the BPEL definition of a process that can be executed within the run-time environment. This meta-data description file is written to a directory structure within the repository and preferably has a well-defined file extension (in one embodiment, the default is .kpx extension). Since the process file format is XML, migration of the process between releases can be achieved using XSLT.

Process palette 560 permits processes to be orchestrated. Activity palette 502 permits activities to be orchestrated. For an activity, or web service operation, to be recognized and used within the activity palette 502 a meta-data description file must exist within a specified repository path. This description file may contain the following types of information: an activity header containing information regarding the target namespace of the service but also what platform provides the service, i.e. .NET™ or Java, an activity name, an activity description, an icon definition, such as either a URL or an encoded binary object, information defining how an operation should be presented as an activity within the palette and configured when placed within a process flow on the canvas.

The studio activity tools 504 can be used to import web and rule service definitions into the repository such that they can be exposed as activities within the palette. Examples of studio activity tools 504 include a web service import tool, a rule service import tool, and a proxy generation tool. The web service import tool is utilized for importing an existing WSDL, from either URL or file, and creating an associated service definition file within the repository. The rule service import tool is utilized for importing rule services from a rule engine. This allows complex rule sets to be utilized within the process flow. The proxy generation tool generates code that can be incorporated within client applications to call the process externally. The generator supports code generation in the following languages: Java, C#, VB, JavaScript, and J# (.NET™ Java implementation).

Figure 6:
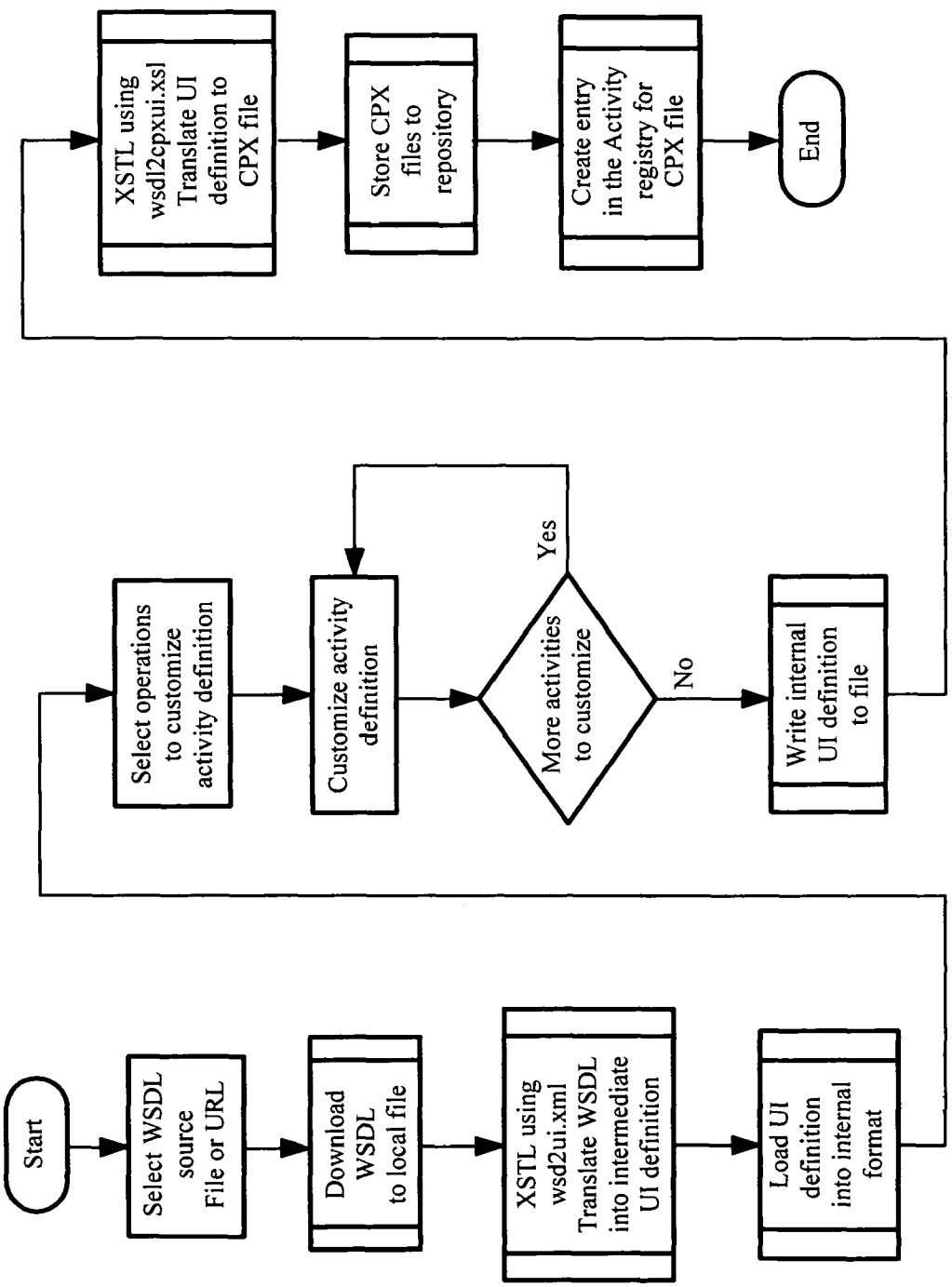
FIG. 6 is a flow diagram of a web service import tool in accordance with one embodiment of the present invention.

The web service import tool is a wizard that defines the steps shown in FIG. 6. These steps provide a mechanism for customizing the web service operations such that they can be integrated seamlessly into the studio. Once the customization information is provided by the user a number of XSL transformations are applied to the resulting documents to output a studio activity definition component properties XML (CPX) file. In one embodiment a CPX file is an XML file describing a set of activities for a particular web service. An activity may correspond to an operation in a web service. A WSDL file for an original web service may, for example, describe interfaces, data type definitions, and binding information. The CPX file describes additional details regarding which operations are enabled as activities, the appropriate user interface representation of inputs and outputs, special binding information (e.g., whether the operations are directly bindable), or other information specific to Foundation Studio 410.

The web services import tool includes two style sheets, one that processes the WSDL and creates a default intermediate user interface (UI) definition, and one that takes the customized intermediate user interface definition and outputs the CPX file. Once the CPX file is generated it is copied to the repository and registered, along with its source WSDL, with the service registry.

Figure 7:
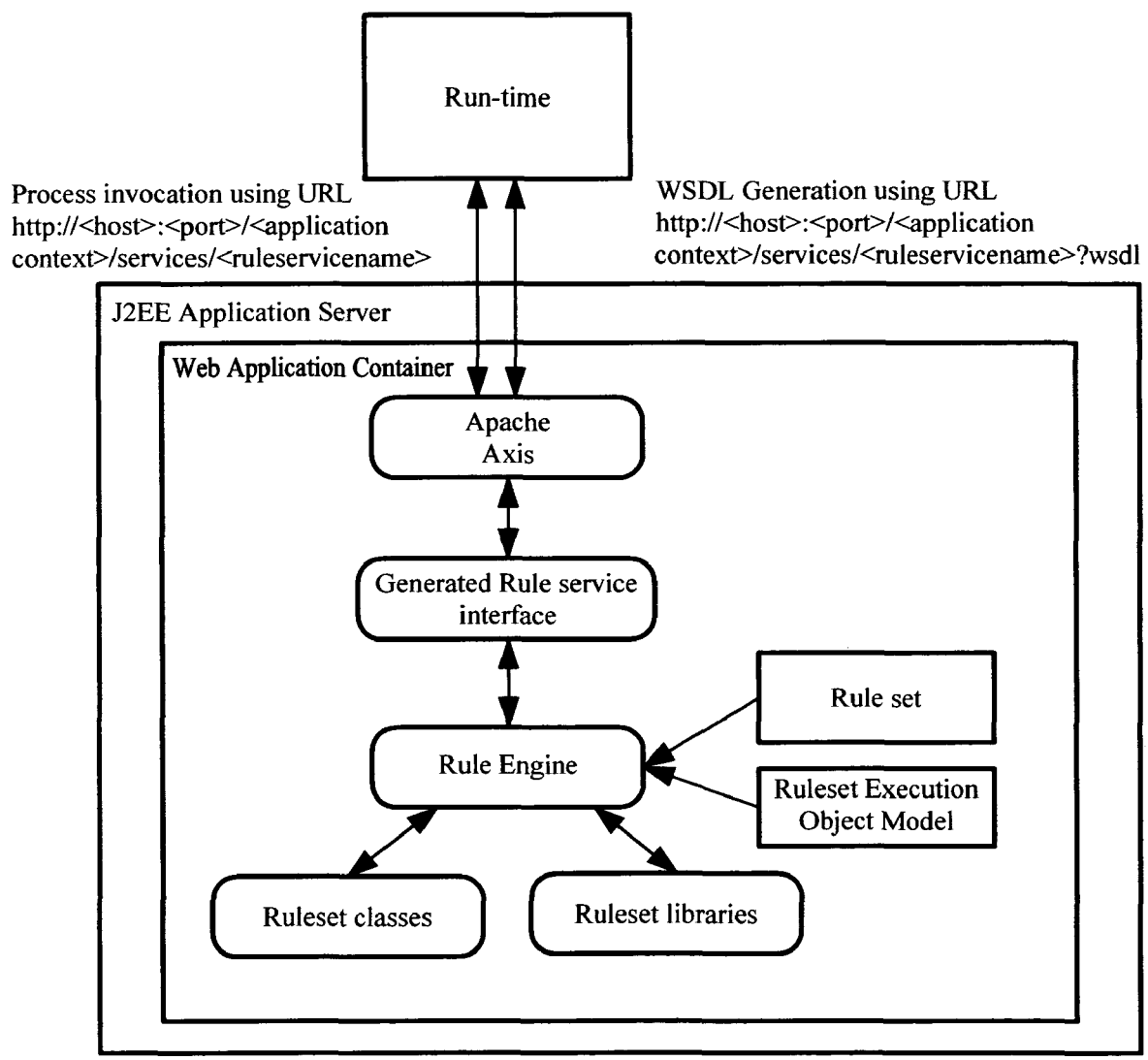
FIG. 7 is a diagram of rule service import application in accordance with one embodiment of the present invention.

FIG. 7 shows the architecture of a rule service deployment such that it can be used as an activity. An import wizard (not shown) is provided for loading rule service definitions as activities for manipulation on the desktop visualization tool. As previously described, in addition to conventional BPEL process flows, embodiments of the present invention permit custom rules to be defined. A rule service is basically a web service that contains all the information necessary to deploy and execute a rule set using a web service SOAP request. The rule service import tool reads an existing rules file and creates a deployment package that can then be automatically deployed on the same application server environment used by the foundation server 440. Once the rule service is compiled, packaged and deployed within the application server, the user is then allowed to customize the activity representation using the existing web service import tool, which loads the rule service WSDL definition based on the deployment options specified.

Returning to FIG. 5, the studio integration services consists of a number of modules that are used for communicating with the run-time environment, these are implemented as .NET™ assemblies. The repository data access objects (DAO) 510 is a set of interfaces that wrap the implementation of the repository connection. This provides the flexibility to be able to utilize a different repository structure if necessary. The WebDAV libraries are an implementation of the DAO interfaces that are able to communicate with WebDAV server implementations, as provided by the foundation server. The process debug interface 518 provides a connection to the run-time over which execution state can be passed allowing the studio to control and view execution of the process. The dynamic web service process invoker 520 provides a mechanism for dynamically calling web services based on the WSDL definition. When a process is executed by the studio, the WSDL is loaded and a dynamic assembly is built and used to process the request.

Figure 8:
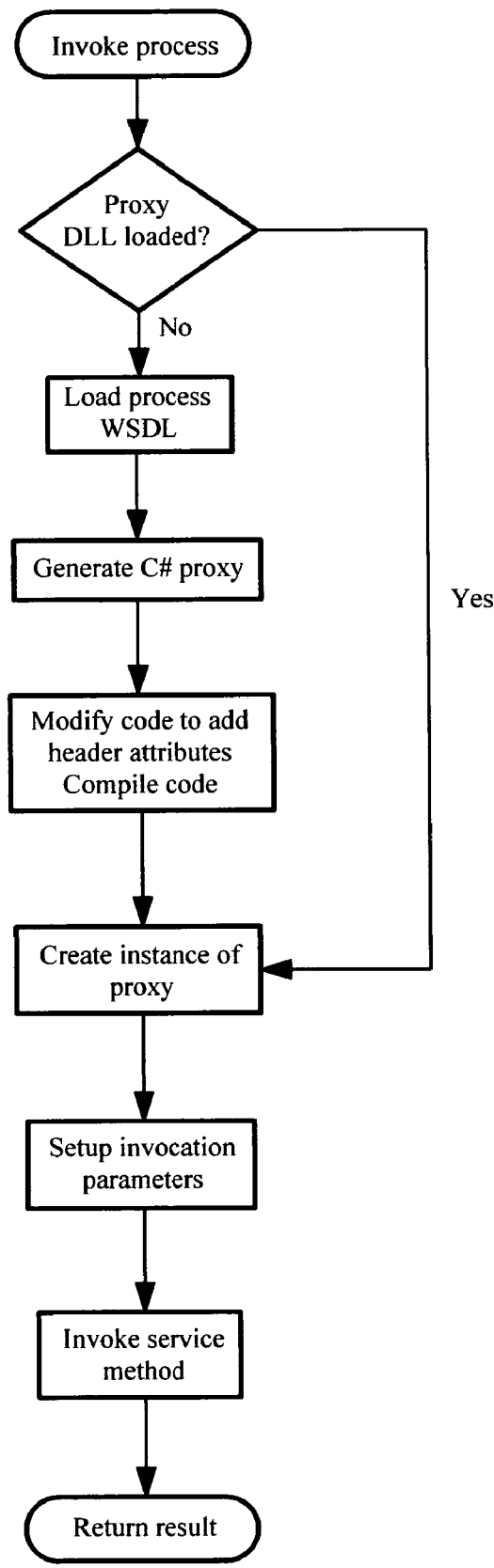
FIG. 8 is a flow diagram of a method of proxy generation in accordance with one embodiment of the present invention.

Since each new process is exposed as a web service by the foundation server 440 the studio needs a mechanism for dynamically executing these services based on the WSDL description of the process. In order to do this, using .NET™, a web service proxy class needs to be dynamically compiled into an in memory assembly (DLL) and then called. FIG. 8 provides an overview of the dynamic web service generation and invocation architecture. The architecture takes advantage of .NET™s WSDL import tools and ability to create in memory assemblies. When an execute request is processed the proxy class is generated from the process WSDL using the .NET™ code generator. Code compilation takes place in memory resulting in an in memory assembly that is loaded into the current application domain. Once loaded an instance of the proxy class is created using the .NET™ type library, and method parameters are assigned based on the operation signature as defined within the WSDL. The method is then invoked and the resulting object is passed back to the studio by the proxy as the process output.

Referring again to FIG. 5, in one embodiment the .NET™ extension API 418 includes a CSV API 580 to get information from CSV files, a PDF API 582 to get information from PDFs, an Excel API® 584 to get information from Excel documents, and a database API 586 to get information from a database. JAVA extension API 416 may include real time data access API 590 and dynamic activity scripting API 592 for custom navigation and extractions.

Since custom activities can be implemented in multiple programming languages the foundation studio 410 provides a mechanism for creating custom activity configuration UIs using these same implementation languages. This allows the developer to customize the studio behavior using the implementation language most familiar to them. To do this a configurator framework allows these UIs to be dynamically loaded and viewed from within the studio by selecting a specific activity on the flow canvas. Which configurator to use is determined by the CPX file definition that contains all the information necessary to present the UI.

For .NET™ activities there is a standard API packaged as a .NET™ assembly. NET™ custom configurators that need to be integrated into the studio must exist within an independent assembly (DLL) and be defined within the Configurators namespace. There is an additional requirement that the class itself should be called Configurator. The entry point of this class can be listed within the CPX file under the operation <customUI> tag, and is defined as the method name that should be called to start the configurator session.

When the configurator is launched, information regarding configurable inputs and the application object model is passed in XML form. The inputs argument contains the list of inputs and their currently assigned values, if any. The application object model contains information on the process, such as container names, process steps, etc. The string returned from the entry point should be an XML document containing the same input and application object model information, with modifications based on the actions taken in the configurator.

In contrast to the .NET™ activity configurators the Java custom configurator API is written in Java and is linked based on the configurator JavaUIInvoker.dll, which is a special instance of a .NET™ activity configurator. JavaUIInvoker.dll opens a socket to allow a Java UI to communicate with a .NET™ application. In this case when a Java configurator is loaded a Java virtual machine (JVM) is launched and a Configurator launcher class is initialized. The target class is defined within the manifest of the jar file that will be loaded. This ensures that the name of the configurator implementation class can be dynamic as required by the component. This class then loads the implementation class, which usually would utilize Java (Swing)/JFC (Java Foundation Classes).

Figure 9:
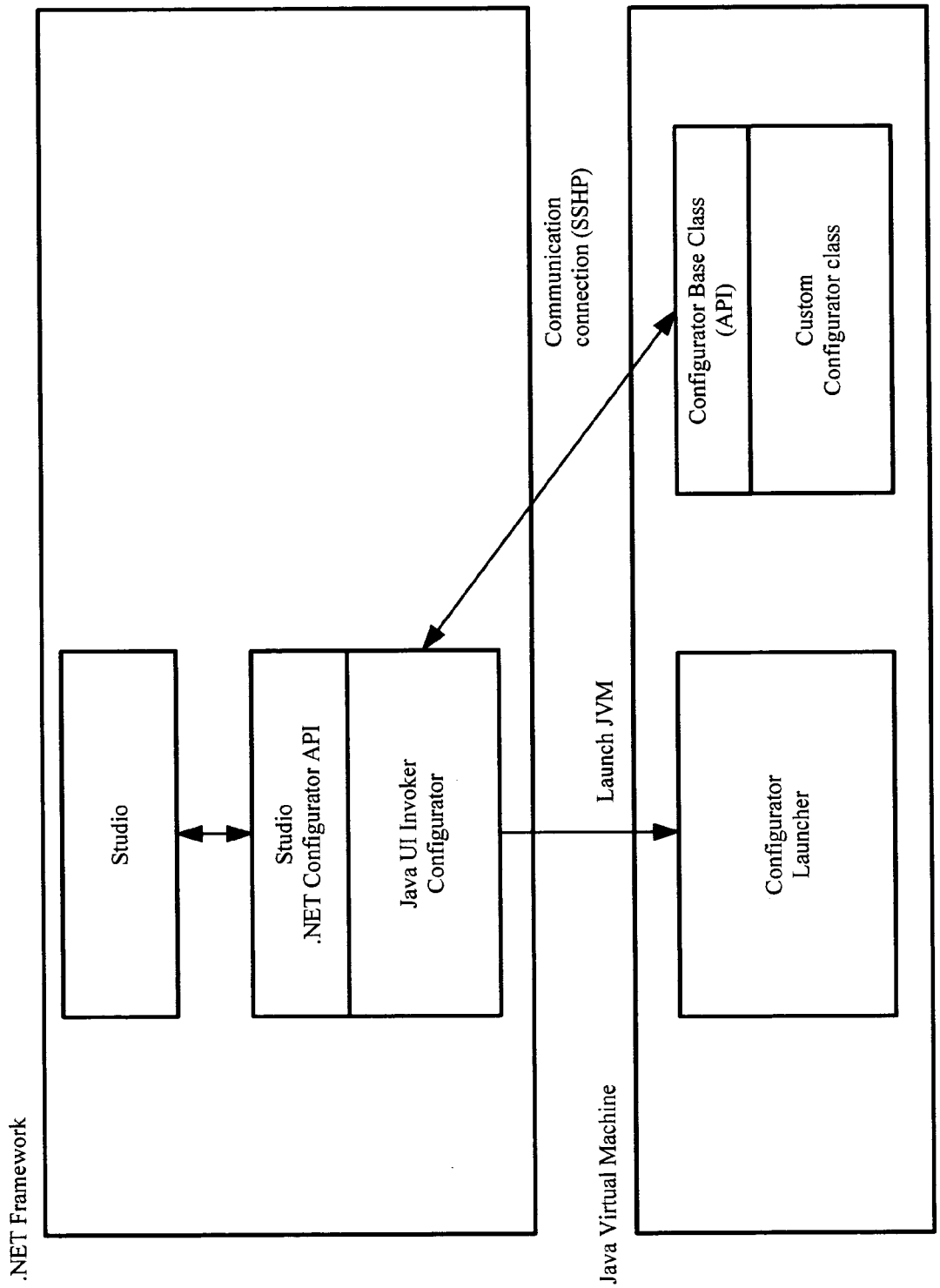
FIG. 9 illustrates a Java activity configurator in accordance with one embodiment of the present invention.

FIG. 9 shows how the communication between the studio and the configurator is done to ensure that the configuration information is correctly displayed and returned from the Java process. The basic communication mechanism is based upon sockets. When the JVM instance is started it is passed a socket port number that is passed as an argument to the Java configurator launcher. The launcher then loads the configurator class, which must extend the base class. As the configurator is initialized the base class will make a connection back to the studio using the passed port, information can then be exchanged and made accessible to the Java configurator code using a standard API. Input and application object model information is passed as previously defined for the .NET™ configurator XML format, and UI events can be exchanged between the studio and the configurator until the user completes the configuration actions.

II. Configurable Electronic Document Navigation and Extraction

In some embodiments foundation studio 410 and foundation server 440 are adapted to permit a user to define information of interest from electronic documents for automatic extractions. In these embodiments, a user may define a navigation path to an electronic document and define a target pattern for scraping information from a target page of an electronic document. The extracted information may be published to a visualization tool, such as an Excel® document. Alternately, the extracted information may also be read as an input to a business process.

Figure 10:
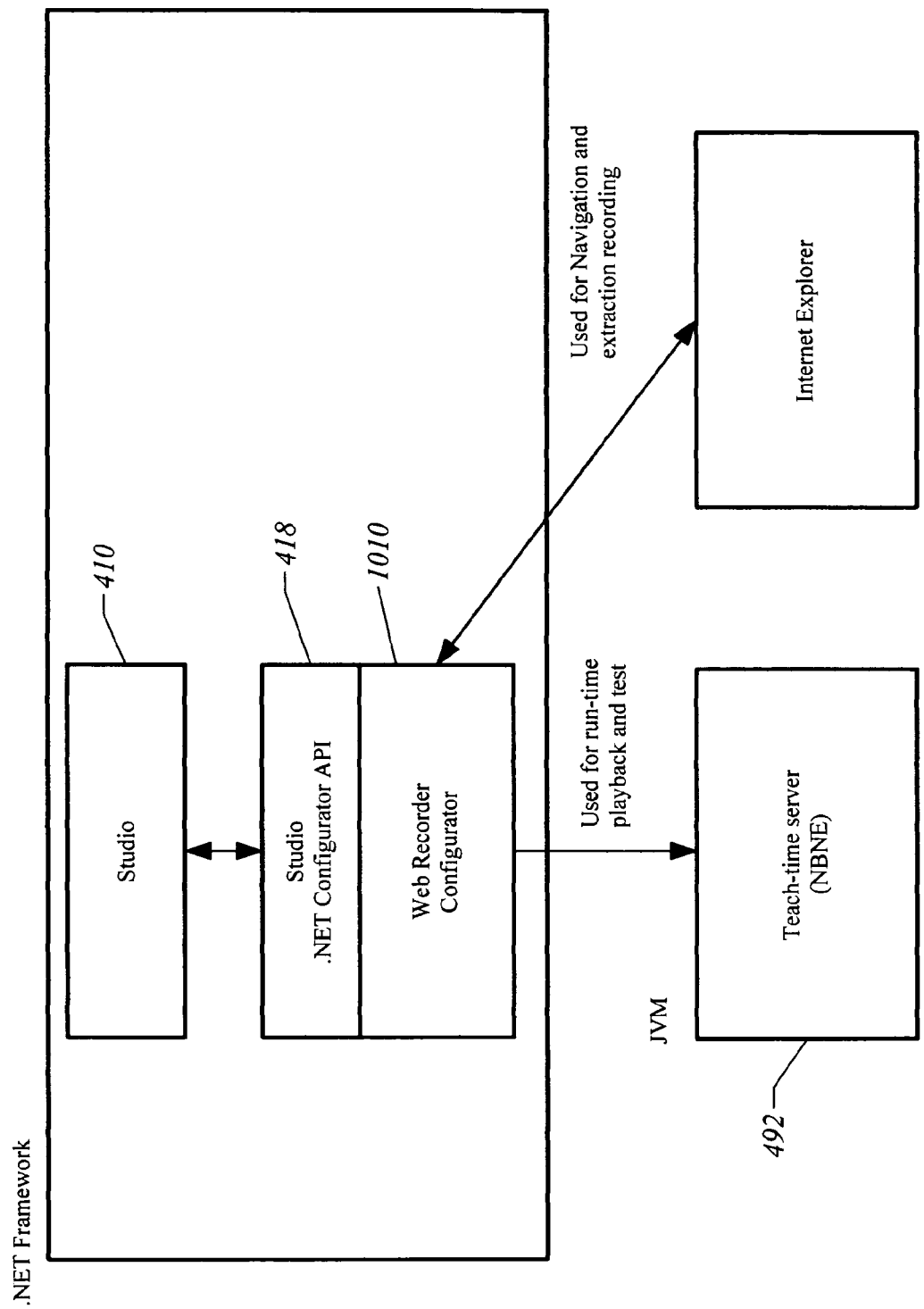
FIG. 10 illustrates a web recorder configurator in accordance with one embodiment of the present invention.

FIG. 10 illustrates one embodiment of a system having a web recorder configurator 1010 and a teach time server 492. Web recorder configurator 1010 records and customizes web navigation steps and permits a user to define target information to be extracted from the resulting page. In order to record navigation steps the web recorder UI initializes an instance of Internet Explorer® providing a browser like interface. The user can then place the browser in record mode allowing each click or keyboard entry to be recorded as they make their selections to navigate to the target page. This can include, for example, recording a navigation path to an electronic document, including passwords, identifiers, or other information required to access the electronic document, which may, for example, be hosted on the internet, an extranet, or an intranet.

Once the navigation path has been customized it can be tuned using a number of different mechanisms to ensure that the final navigation is robust to change. To test the navigation the web recorder configurator 1010 provides a playback mode that will show how the navigation will proceed. Playback is achieved using the run-time browser, NBNE (non-browser navigation and extraction), which allows the navigation to be debugged for possible run-time errors. Once the navigation is recorded the web recorder can be initialized in extraction mode. In this mode the user can select the region or regions of the target page that should be extracted and placed into process variables for later use. There are a number of different strategies that can be employed for extracting information, including DOM based, regular expressions, etc. Once again, when the extraction is ready for testing the user can playback the extraction which results in the run-time browser being used and the resulting table of extraction results is displayed to the user. When navigation or extraction recording is completed the result is a navigation markup language (NML) or information markup language (IML) file respectively.

The NML and IML files are XML files that describe the steps and parameters required to perform the same navigation and extraction at run-time. An NML file is an XML file that describes the user interaction with the browser in the process of accessing a specific web page. An NML file may include, for example, the URL of the web page, any form field values the user might have put in (e.g., login, password, etc.) or the hyperlinks, if any. The NML file permits the steps used to access the webpage to be reproduced at runtime. The IML file is an XML describing the section of a web page to be extracted using the structure (e.g., document object model (DOM)), content, or other criteria. An IML file may contain, for example, information about the container elements (e.g., a table) and a structural pattern. The structural pattern may, for example, be a group of elements having structural congruence and at least one simple arithmetic progression on the relative indexes of one of the elements in the lineage. The IML file provides information to extract data from a given web page into a two-dimensional data structure at runtime. After the initial web recording is completed, teach-time server 492 is provided with the navigation path and target page to permit teach-time server 492 to automatically navigate to the target page and extract information of interest.

Figure 11:
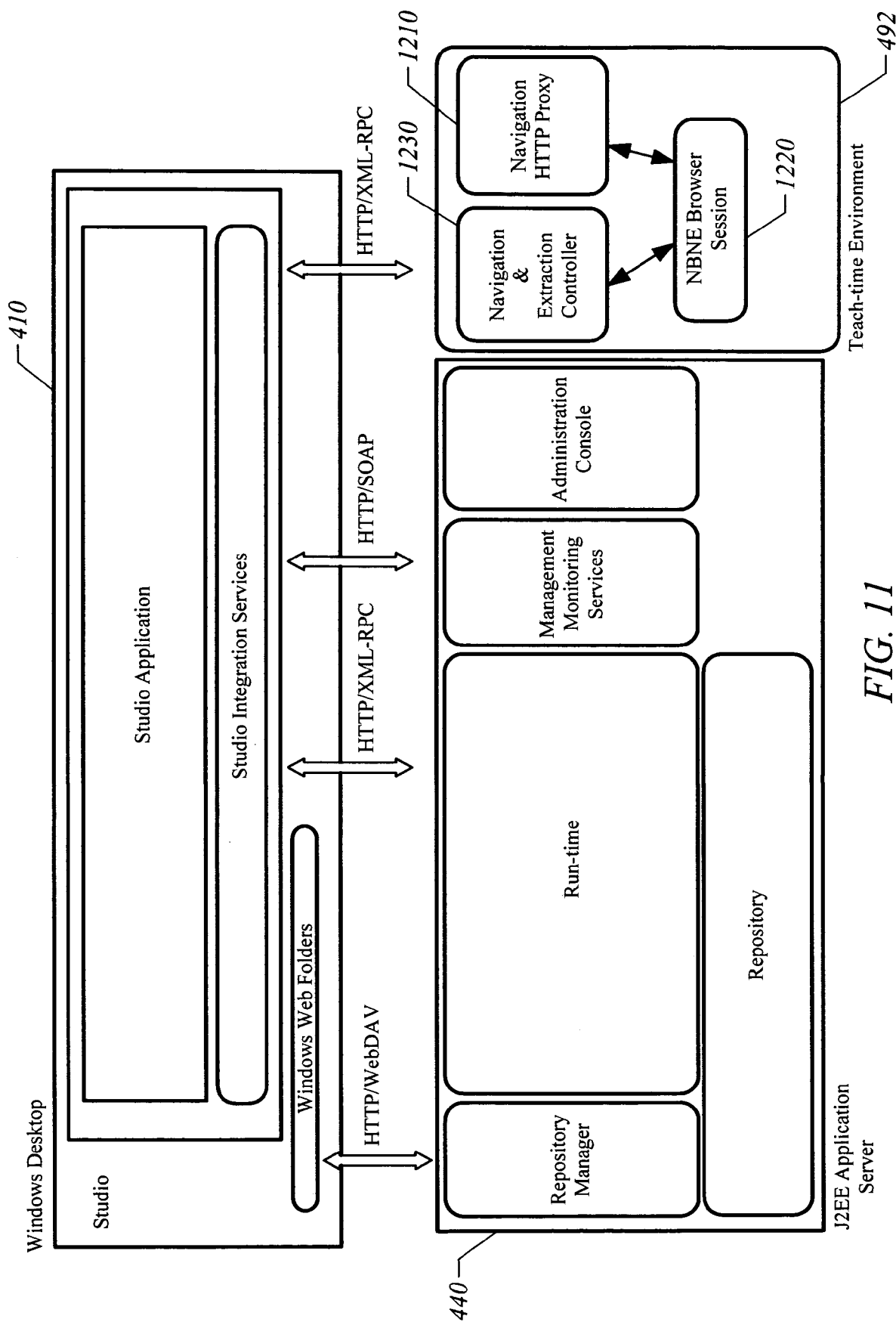
FIG. 11 illustrates a system architecture for a teach time environment in accordance with one embodiment of the present invention.
Figure 12:
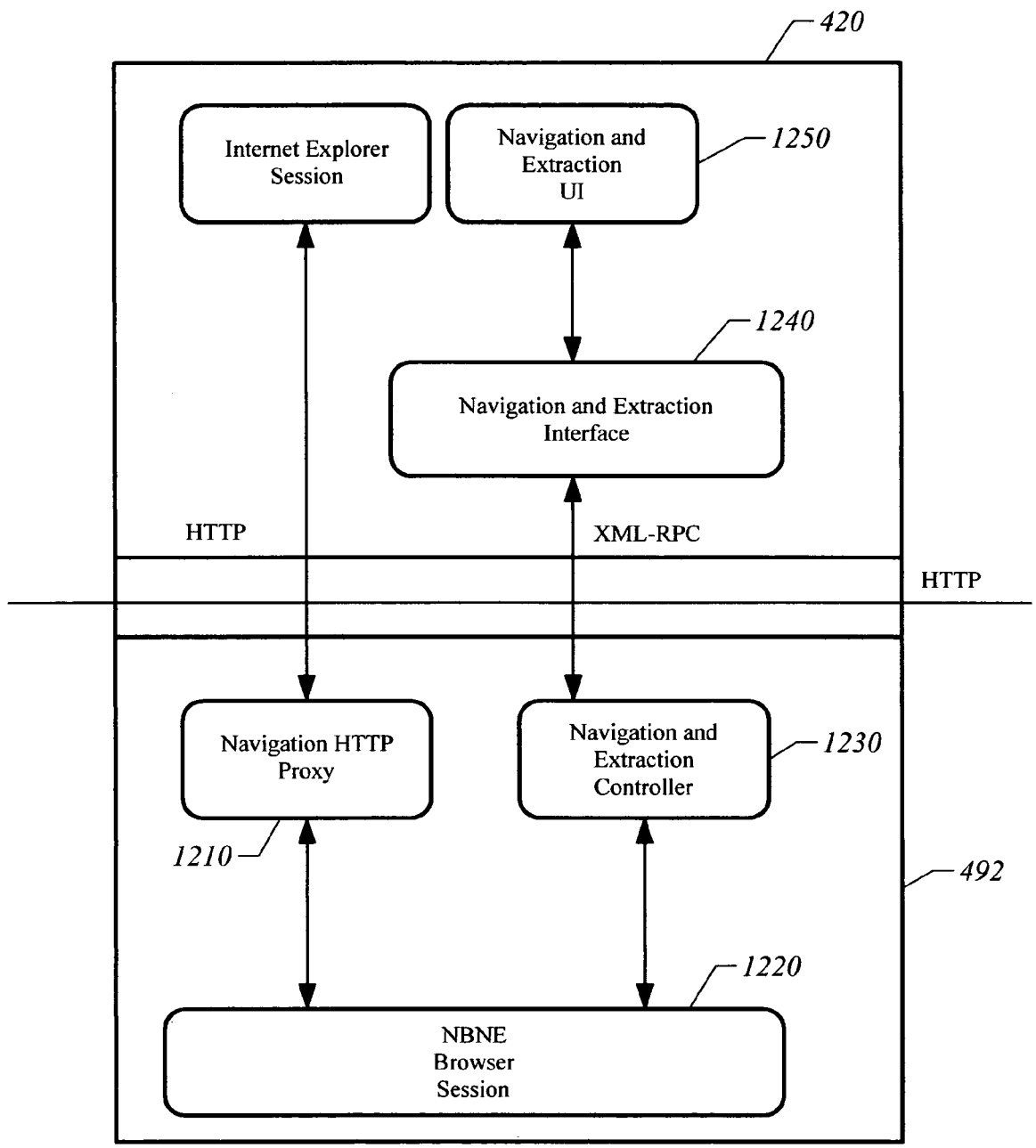
FIG. 12 illustrates submodules of a teach time architecture in accordance with one embodiment of the present invention.

The teach-time environment provides the capability for the studio to record navigation and extractions using the NBNE browser. FIG. 11 illustrates proxy components for the NBNE browser to act upon recorded navigations and extraction during a run time execution of a business process. FIG. 12 illustrates the interaction of components of teach time environment 420 and teach time server 492. A navigation proxy 1210 receives requests from the studio user interface 1240 and passes the requests onto the NBNE browser session 1220. When instructed by the navigation and extraction controller 1230, the navigation proxy 1210 will track these interactions and build a navigation information file. This file can then be used on subsequent navigations to retrieve information from an electronic document, such as a document available on the world wide web. A navigation and extraction controller 1230 controls the proxy and browser session in addition to providing access to base functions of the browser to validate DOM information when recording an extraction. In one embodiment, NBNE browser 1220 utilizes a Java browser.

When the navigation and extraction user interface 1250 of foundation studio 410 requests a navigation session it first initiates a connection to the navigation and extraction controller 1230 using navigation and extraction interface 1240. The controller should respond by allocating a session and passing information regarding the session back to the studio. Once received the foundation studio 410 should then open an Internet Explorer® session directed at the navigation proxy 1210. On this initial connection the browser should pass a navigation session ID, allocated by the controller to the studio, this will link the NBNE session 1220 created to the session being maintained by the controller. Note that this step is only required if support for multiple navigation and extraction sessions is required per single studio instance. If not required this correlation can be performed using the studio IP address.

Once this correlation has been made and the NBNE session has been initiated the studio can request session recording by sending a record message to the controller, which will notify the navigation proxy 1210 to start recording on that session. Recording will continue until a stop recording message is received by the navigation and extraction controller 1230, at which point recording is stopped and the navigation control file is returned to the studio.

Extraction pattern recording is performed slightly differently. In one embodiment, the NBNE session is maintained at the current screen and the user will select DOM ranges within the Internet Explorer® session in the studio. Information on the selected DOM is then passed to the extraction controller 1230 for validation against the current NBNE session. If validated then the extraction is appropriately rendered and returned to the studio. If not then the studio needs to notify the user, or needs to correct the selection internally.

III. Real Time Data Server

Figure 13A:
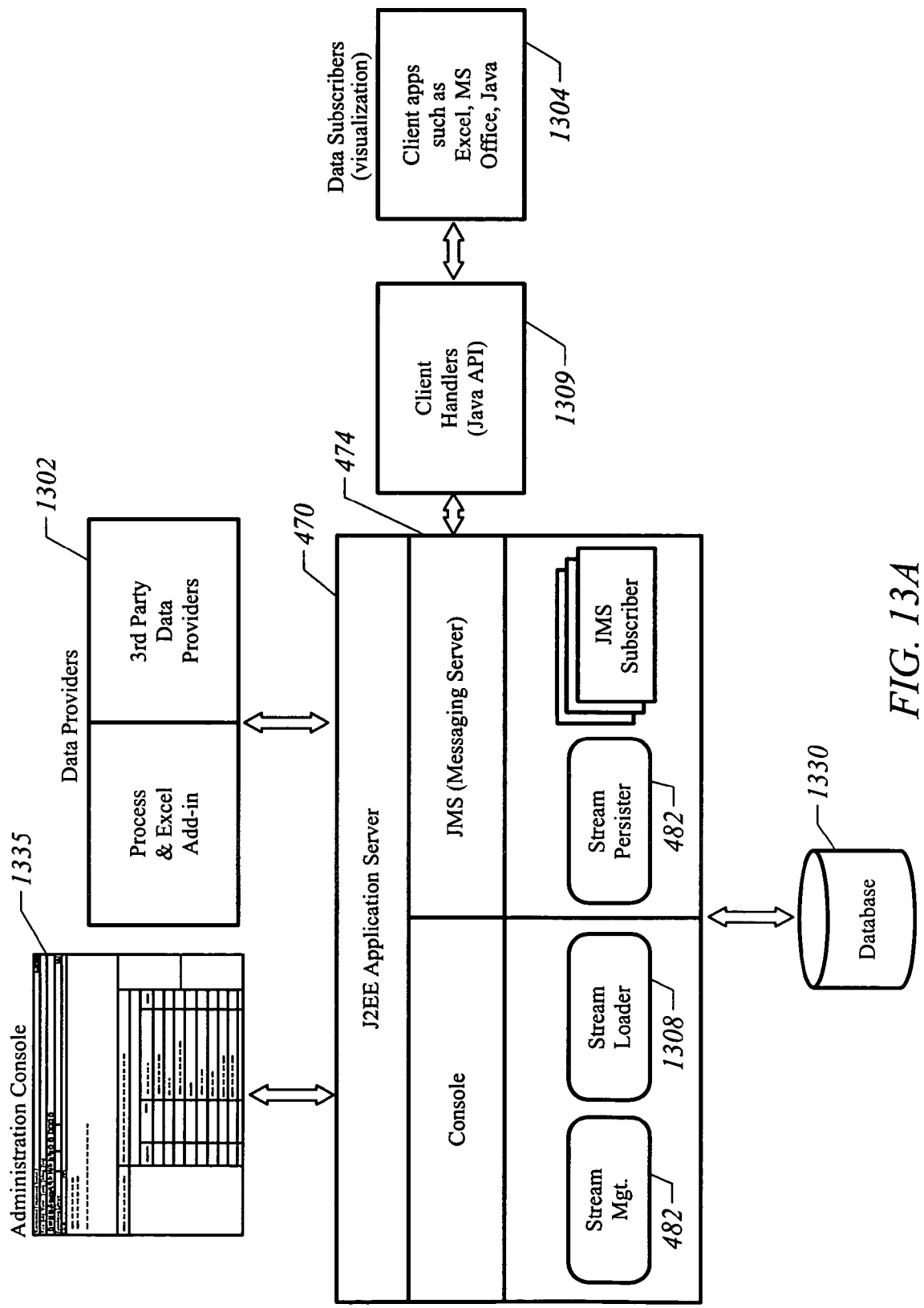
FIG. 13A illustrates a real time data server for accessing streaming data in accordance with one embodiment of the present invention.

Referring to FIG. 13A, the real time data access server 470 provides a mechanism for streaming data element updates from data providers 1302 to data subscribers 1304 using a Java messaging system (JMS) 474 and a client handler 1309. Data subscribers 1304 may, for example, be client applications such as Excel®, Microsoft Office®, or Java applications. A stream loader 1308 permits loading of streaming data. Examples of streaming data providers include, for example, the Bloomberg corporation and the International Energy Exchange (ICE). Other examples include custom process or information obtained from an Excel® add-in, as described below in more detail. In some embodiments, the data is published to, for example, a visualization tool such as an Excel® document so that a user can see current data values of selected types of streaming data. However, the published data may also be used as a data provider for a business process. This permits real time data to be integrated with static data sources.

Figure 13B:
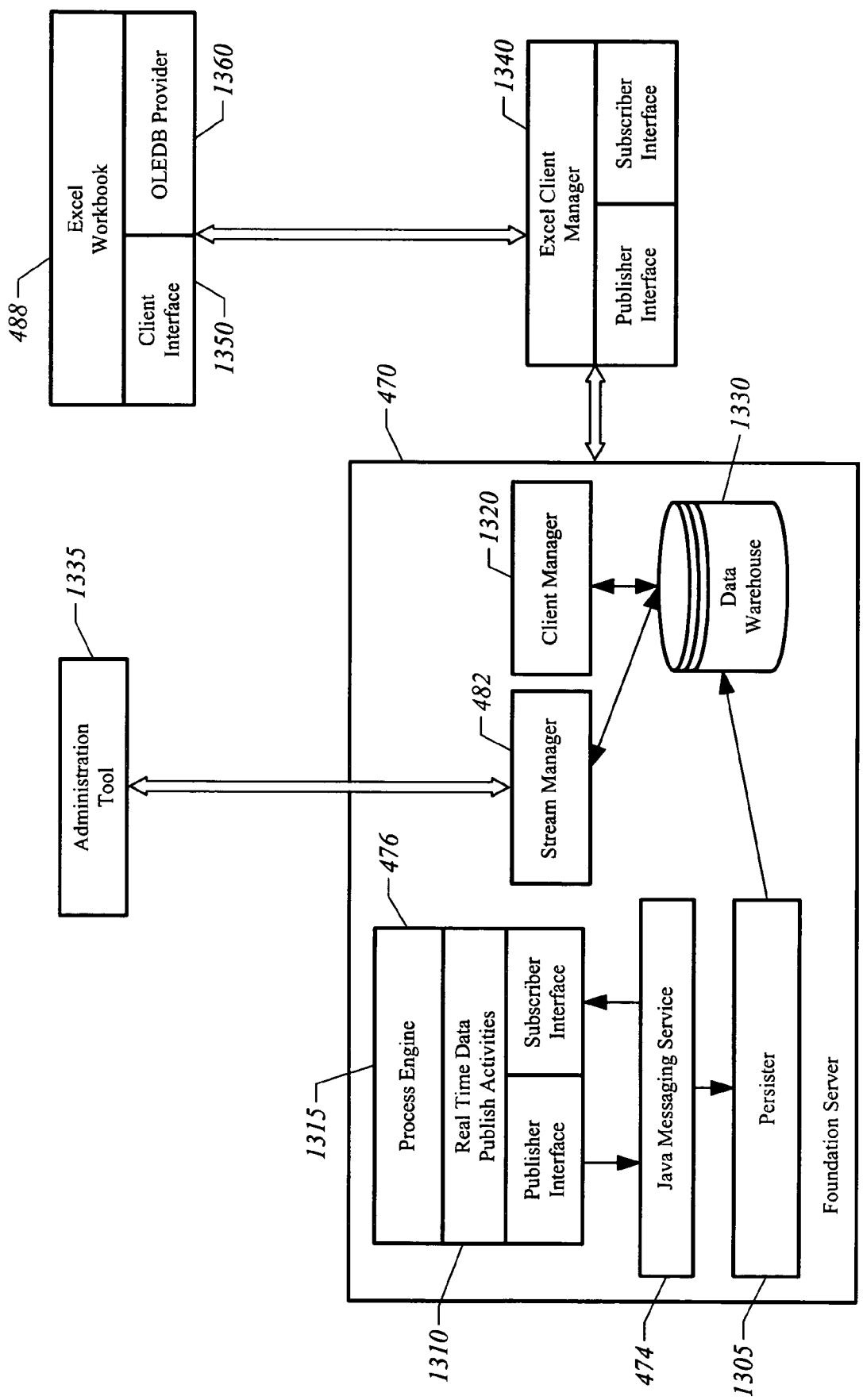
FIG. 13B illustrates a real time data server for accessing streaming data in accordance with one embodiment of the present invention.

FIG. 13B illustrates in more detail sub-modules of the real time data access server 470. The Java messaging service 474 is provided by the application server or by a 3$^{rd}$ party messaging service such as the message queuing (MQ) series. Messaging is provided by JMS, which provides a number of advantages including its ability to be clustered and transactional. Specifically, all data updates are published using a topic that provides a one-to-many publisher/subscriber delivery mechanism. Publishers and subscribers interact with JMS 474 and stream management facilities using well-defined application programming interfaces (APIs) to read selected data types from the data stream.

The publisher interface 472 provides the capability for creating new data streams in addition to actually publishing updates to the JMS topic. The subscriber interface 476 provides an event notification mechanism that will pass updates to a set of listeners via a listener interface.

The real time data publish activities 1310 is a set of activities that provide the capabilities to interact with the provider interface and also to the stream manager. Functions that are exposed allow processes to create, update, and publish data streams.

Since JMS topics are one to many a persister 1305 is also implemented as another subscriber allowing updates to be passed to the clients without introducing the latency of storing the update. This means that subscriber delivery is extremely low latency. The persister 1305 may be implemented as a message driven bean EJB (MDB) that subscribes to the real time data access topic. Using MDBs not only has the advantage that it can be clustered and is transaction, but also that the application will automatically handle allocation of bean instances based on real time data access allowing for data updates to be stored as quickly as possible.

The stream manager 482 may be implemented as an enterprise stateless session bean that allows clients to change stream configuration and to query the current content of streams.

The client manager 1320 provides a mechanism for allocating client manager instances by type such that as new clients come online they can be load balanced and clustered. The data warehouse 1330 is the RDBMS and associated schema that stores all the current and historical data streams updates. The administration client 1335 is a web based interface for interacting with the stream manager object. The Excel® client manager 1340 handles multiple Excel® clients. Note that each workbook 488 as an individual client has an on demand client interface 1350 for accessing data and a real time object linking and embedding data base (OLEDB) provider interface 1360 for providing data.

In one embodiment, the publisher is an activity that exposes the publishing interface for use within processes authored within foundation studio 410. In this embodiment, the subscriber is the Excel® client manager, which handles interactions with multiple Excel® clients. When a workbook is opened within Excel® a set of macros is installed within the workbook that initiate a connection to an active instance of the Excel® client manager. To locate an instance of the Excel® client manager, the Excel®/real time data client interface sends a request to the client manager using a web service call. The web service call returns a location (IP address and port) that can be connected to. This lookup mechanism allows Excel® client managers to be clustered. Once connected, the interaction between Excel® and the Excel® client manager is done using a software module information protocol (SMIP). The Excel® client can then subscribe to multiple streams and also publish data back into the real time data access server 470.

IV. Foundation Server

Figure 14:
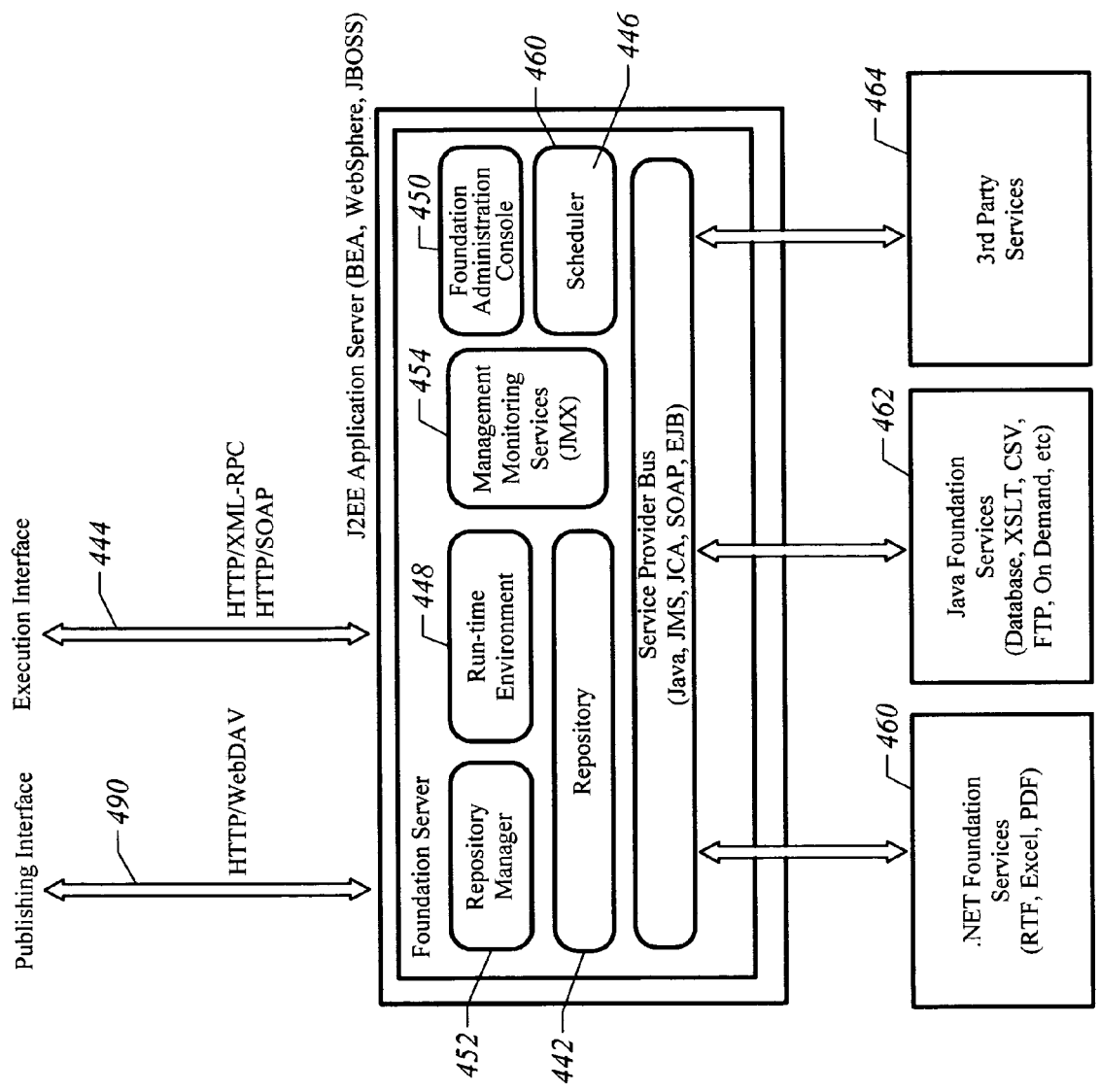
FIG. 14 illustrates a foundation server in accordance with one embodiment of the present invention.

FIG. 14 shows in more detail submodules of an embodiment of the foundation server 440 that is based on a J2EE application server architecture. In one embodiment repository 442 for the foundation server 440 utilizes a content management framework, based on the Apache Slide project of the Apache Software Foundation, which provides support for the Apache community of open-source software. Slide provides a hierarchical organization of content that can be stored into multiple data sources. Slide also provides a framework for security, locking and versioning of assets stored within the hierarchy. Additionally, Slide provides a WebDAV servlet that may be used to communicate with the Windows® Desktop. The repository 442 may also include a Slide browser and Slide API.

In one embodiment, when repository content, either processes or activity configuration files, is deployed to the repository 442, the repository 442 is responsible for notifying any active run-time instance that the deployment has happened. This ensures that when the process is next executed the correct version of the process is used since the current entry will have been invalidated. In addition, since the run-time can be deployed in a clustered environment the architecture ensures that all nodes within a cluster are notified. In one embodiment, a slide content interceptor object is included. When content is added, updated, or removed from the repository 442, methods are called on this slide content interceptor object to allow processing of the content both before and after the event.

Scheduler 446 permits run-time environment processes to be invoked on a schedule. The schedule is implemented using JMX events linked within the management and monitoring services provided by the foundation server 440. Using this mechanism allows for the schedule information to be centrally stored, even within a clustered environment. When the scheduler application instance is initialized it creates a number of executor threads that are available for execution of scheduled jobs.

RTE 448 includes an execution engine (not shown in FIG. 14). The execution engine provides orchestration of components by allowing them to be pieced together using a BPEL document (process document). A process document describes which components are to be used and how, including what data is accessed, where it is transferred, how it is stored and what operations are performed on it. The execution engine then uses this process document to execute the actual process described.

Figure 15:
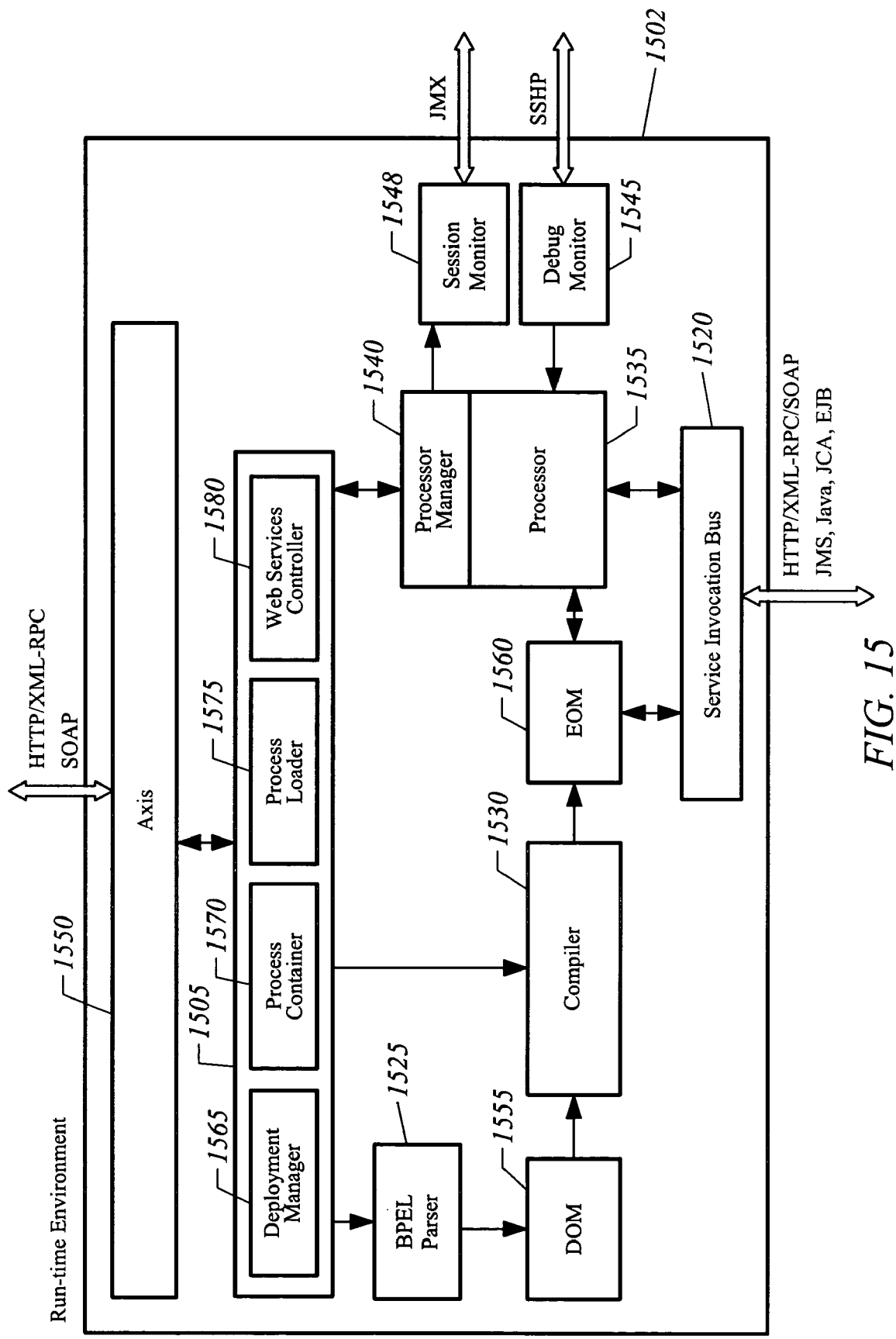
FIG. 15 illustrates a run time environment in accordance with one embodiment of the present invention.

FIG. 15 shows an embodiment of an execution engine 1502 in a run time environment. As has been mentioned previously processes may be defined using the BPEL4WS process execution language. The execution environment provides a web services gateway 1505, service invocation bus 1520, BPEL parser 1525, BPEL compiler 1530, processor 1535, session monitor 1555 and debug monitor 1560. Web services gateway (WSG) 1505 is the "adapter" or "gateway" from the execution engine to the web services container in which it is deployed. It may be implemented using an Apache Axis 1550, where the Apache Axis is an implementation of the SOAP protocol developed by the Apache Software Foundation. WSG 1505 contains all classes and components for interacting with servlet containers and web services containers. It routes web service invocations to the correct process, dynamically deploys processes to the web services container and performs any message translation necessary between the container and the process.

In one embodiment the WSG 1505 consists of a process container 1570, deployment manager 1565, process loader 1575, and web services controller 1580. The process container 1570 is a wrapper that exposes a process as a web service. The web services controller 1580 handles loading the correct implementation of deployment manager 1565 based on the web services container. A container request handler is registered with the web services container as the handler for all requests bound for process services. It is registered with the web services container by the container specific implementation of deployment manager 1565. The container request handler first performs any validation required and translates the message into a WSIF request and WSIF response. It then invokes the appropriate process service via the web services controller. At this point, the message has arrived at the correct process service. If the message is destined for an existing process, the message is placed into the container of the appropriate activity, for instance a receive or pick. If however, the message does not correspond to an existing process, a new one must be created. After the new process is created, the message is placed into the container for the appropriate activity.

To facilitate more efficient execution of processes the service invocation bus 1520 will provide asynchronous execution of invoke and copy activities. A processor 1535 will determine whether a virtual process can be placed onto the SIB 1520. If it can, the processor 1535 places the process onto the SIB where it will be picked up by a worker thread from an invocation bus thread pool. When the invoke or copy activity has completed, the corresponding processor thread will be notified via an event. The invocation bus 1520 is preferably capable of growing or reducing the number of threads executing operations based on administrative instructions or runtime statistics.

The BPEL parser 1525 parses the BPEL document and any associated WSDL documents to create the document object model (DOM) 1555. The DOM 1555, as its name suggests, is merely an object representation of the BPEL document. The BPEL parser checks the BPEL document for syntax validity.

The BPEL compiler operates on a parsed DOM structure output by the parser and creates an executable object model (EOM) 1560 of the process. Once a DOM 1555 has been compiled into an EOM 1560, it is ready for execution by the processor 1535. The compiler 1530 validates as much of the DOM 1535, for semantic correctness, as possible.

The processor 1535 is a virtual multi-processor machine capable of executing EOMs as virtual machine processes. A single processor is capable of executing a single, top level process at a time. Since a process may spawn additional processes during execution, a processor is capable of "context switching" between these processes to provide virtual-parallel processing. A processor executes its own thread.

In order to provide parallel execution of processes, each processor must be capable of context switching between the processes that are spawned during execution. In one embodiment each process maintains an internal queue of steps. In this embodiment, a processor knows whether a process is ready to execute a step and whether it is finished with the step. If it is ready to execute, the processor instructs the process to execute. When the step is complete, control is returned to the processor where a decision is made whether to execute the next step, place the process back onto the process queue to execute later, or to wait on a registered debug monitor.

A processor manages a process instance to completion. A single processor manager 1540 will manage all processors within the execution engine. When a process is placed onto a process queue by the process manager 1540 one of the processors removes it from the queue and begins to execute it. The initial process is the primary process corresponding to an EOM instance for a particular request. However, each primary process may spawn child processes that execute in the same processor. The processor manager 1540 is capable of growing or reducing the number of processors based on administrative instructions or runtime statistics.

The session monitor 1548 allows remote monitoring of processes that are executing. During execution, a processor 1535 sends the state of the processes it is executing to any registered session monitor listeners. This can be used, for instance, to allow administrators to monitor executing processes via a web interface. There is no limit on the number of session monitors 1548 that may watch a process. The processor's 1535 responsibility is to publish the state of a process as often as is practical to a standard interface. Process state is published at the end of each process step.

The debug monitor 1545 provides debugging capability down to the process activity level. During execution, a processor 1535 will publish the state of the processes it is executing to any registered debug monitors 1545. The processor will then receive a response specifying whether it should stop or continue. If a breakpoint, or step condition is encountered, the processor 1535 must transfer control to the debug monitor 1545 and wait for the next instruction. This allows a debug client to control the execution and monitor the flow of an executing process.

Figure 16:
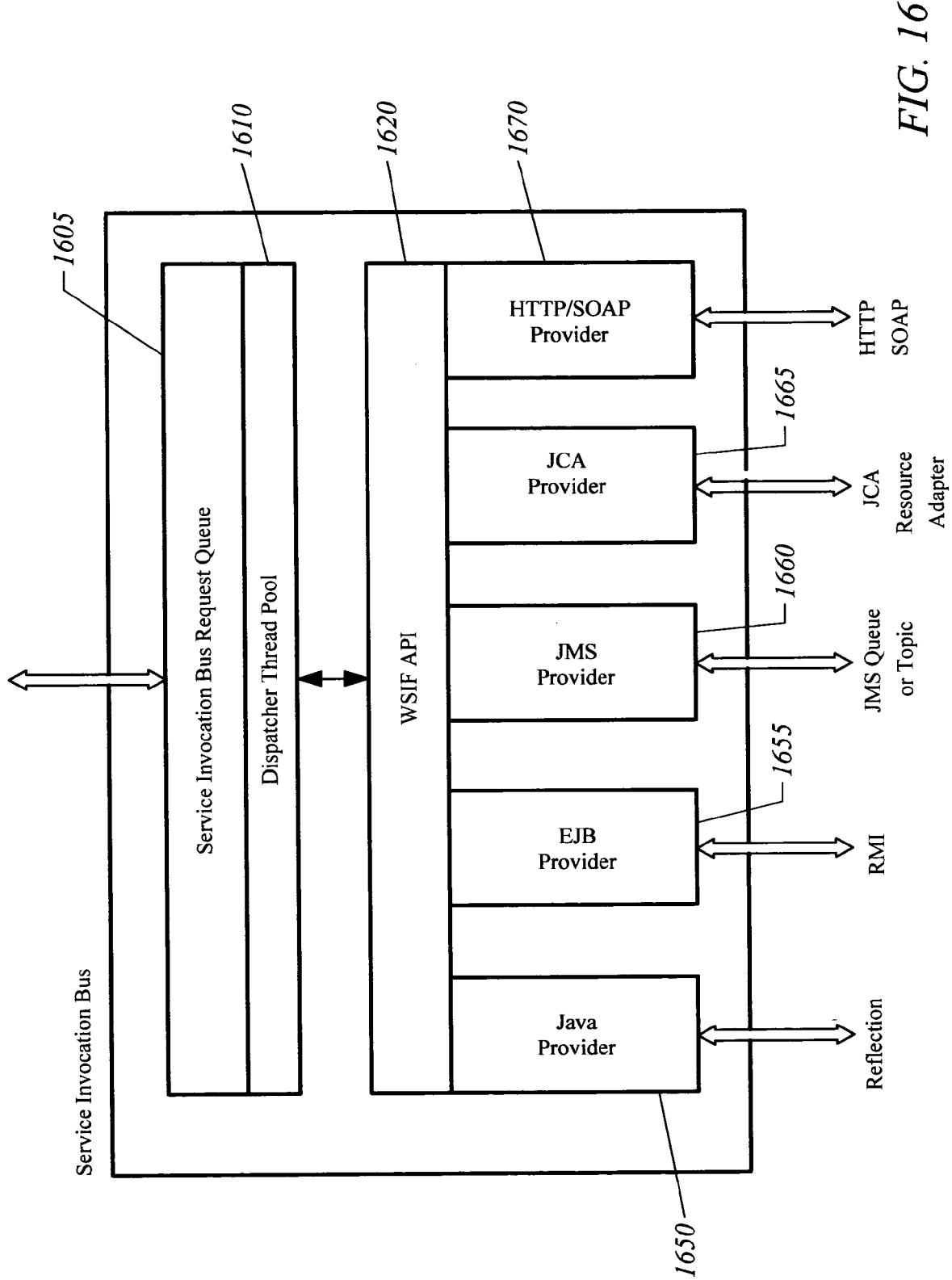
FIG. 16 illustrates a service invocation bus in accordance with one embodiment of the present invention.

FIG. 16 shows the architecture of the service invocation bus provider interface. As a process executes, activities that are invocations of other web services or data transporters (such as copying) are placed onto the SIB. Internally, the SIB maintains a queue of activities 1605 and a pool of threads 1610. The activity is placed into the queue 1605 and picked up and executed by a thread from the pool 1610. This allows these activities to be executed in parallel to the parent process and allows the processor to continue executing queued processes. When an activity has finished on the SIB a notification event is sent to the processor that owns the "primary process" to which the activity belongs. The processor then decides what to do with the finished activity. In most cases, the finished activity will simply notify links or parent activities that it has finished. SIB includes a provider interface 1620. Runtime binding to the appropriate provider occurs as activities are invoked within a process. The SIB loads the WSDL definition for the web service that implements the activity and evaluates the binding mechanism. Once the binding is determined the request is routed to the appropriate provider implementation that then performs the invocation. The provider interface thus performs a mapping for the WSDL operation definition, including message types, and binds the operation semantics onto the physical connection medium. Examples of supported providers are a Java provider 1650, an EJB provider 1655 for remote method invocation (RMI), a JMS provider 1660 for accessing a Java messaging server queue or topic, a J2EE connector architecture (JCA) 1665 as a resource adapter database drivers, and a HTTP/SOAP provider 1670. Additional providers can be added by creating a provider that conforms to the WSIF (Web Services Invocation Framework) specification.

Java enables any Java class to be loaded and invoked using Java reflection. Methods on the Java class are discovered based on the types specified in the WSDL operation definition. Activity parameters are translated from their XML Schemas definition (XSD) schema types to their Java equivalent and passed in the order specified by the activities web service operation. Enterprise Java beans (EJB) provides the capability for an EJB instance to be connected to, via JNDI, and mapping the activity definition onto a specific method on the EJB remote interface. JMS provides the capability to create a JMS message based on the operation/activity parameters. The WSDL binding within the service WSDL contains information that allows the parameters to be translated into either a text or an object message. JCA provides the capability to define a service that binds activity operations to methods on a JCA resource adapter interface.

Figure 17:
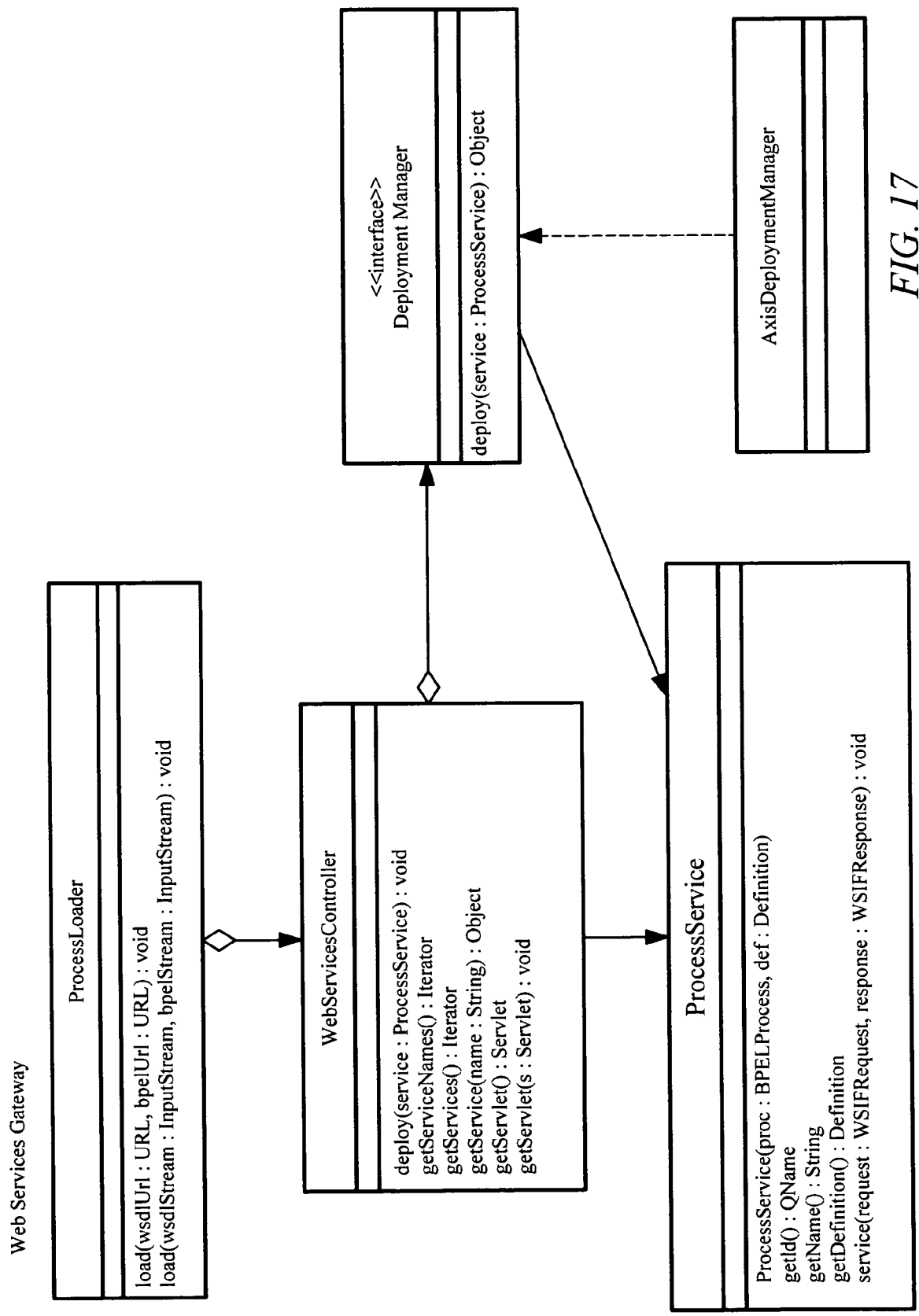
FIG. 17 illustrates a web services gateway in accordance with one embodiment of the present invention.

One embodiment of a web services gateway is illustrated in FIG. 17, showing exemplary operations. The web services controller loads an appropriate deployment manager, such as an Axis deployment manager. Request handlers use the web services controller to choose an appropriate process to invoke based on the name. The process service wraps distinct processes. The process loader handles the details of parsing raw BPEL and WSDL documents into BPEL process instances and definition instances, respectively.

Figure 18:
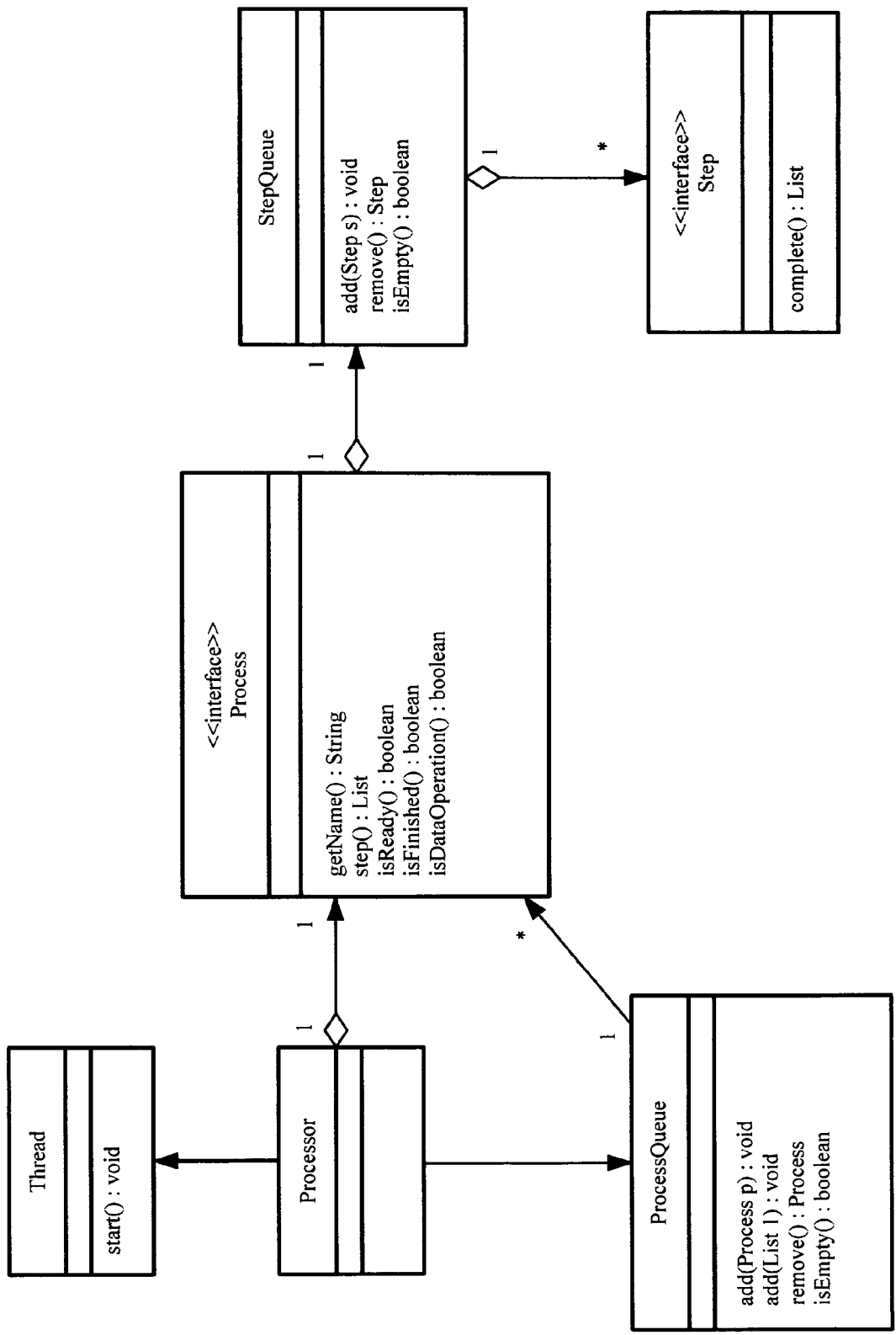
FIG. 18 illustrates a virtual processor in accordance with one embodiment of the present invention.

One embodiment of a virtual processor is illustrated in FIG. 18. In this embodiment, the processor has a process queue to schedule the execution of processes. A step queue is used to execute a particular process as a sequence of steps.

Figure 19:
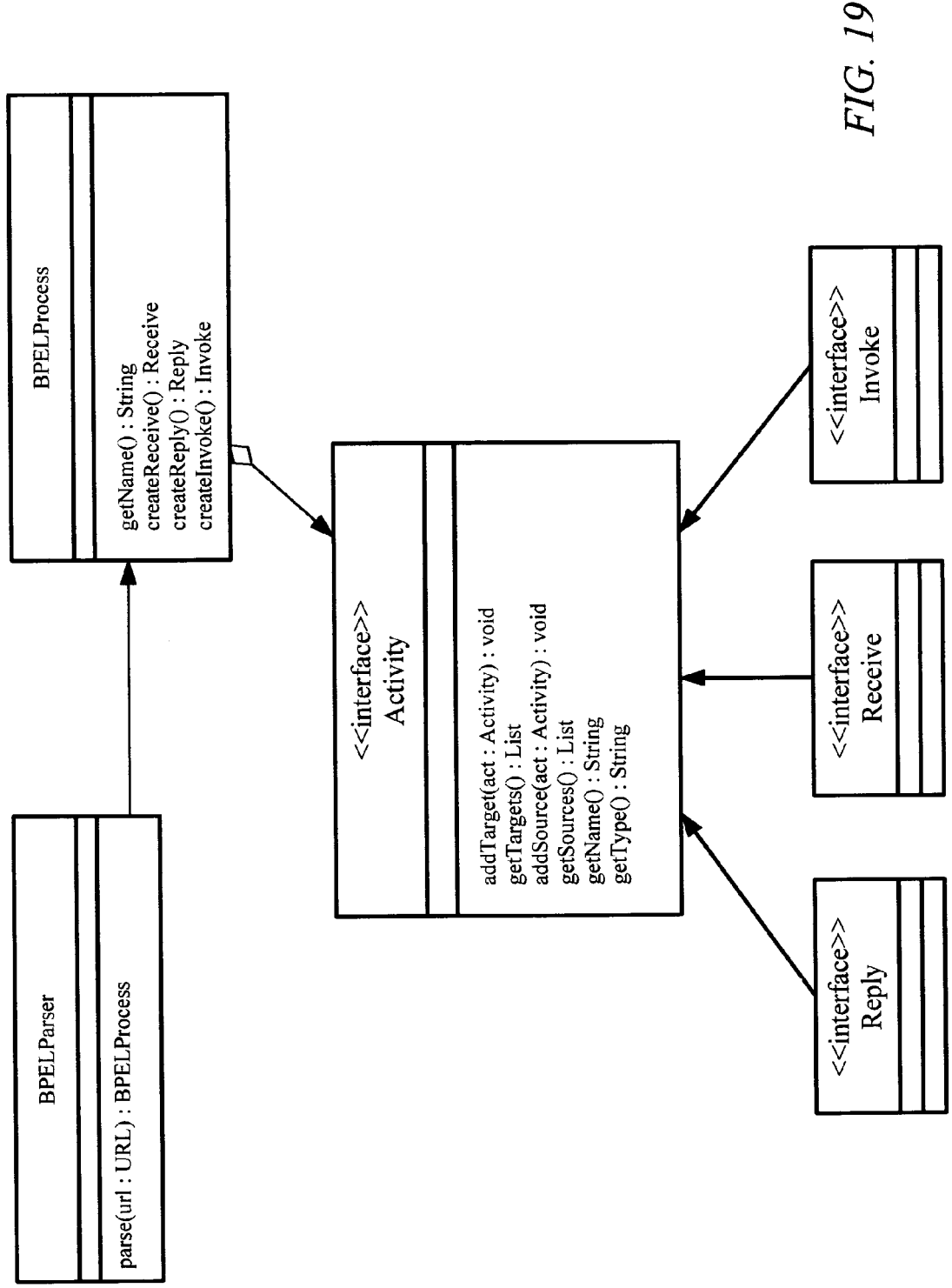
FIG. 19 illustrates a BPEL parser and DOM in accordance with one embodiment of the present invention.

FIG. 19 illustrates an embodiment of a BPEL parser that operates on a BPEL document and produces a document object model. In the illustrated example, the reply, receive, and invoke interfaces are representative of a collection of BPEL activities.

Figure 20:
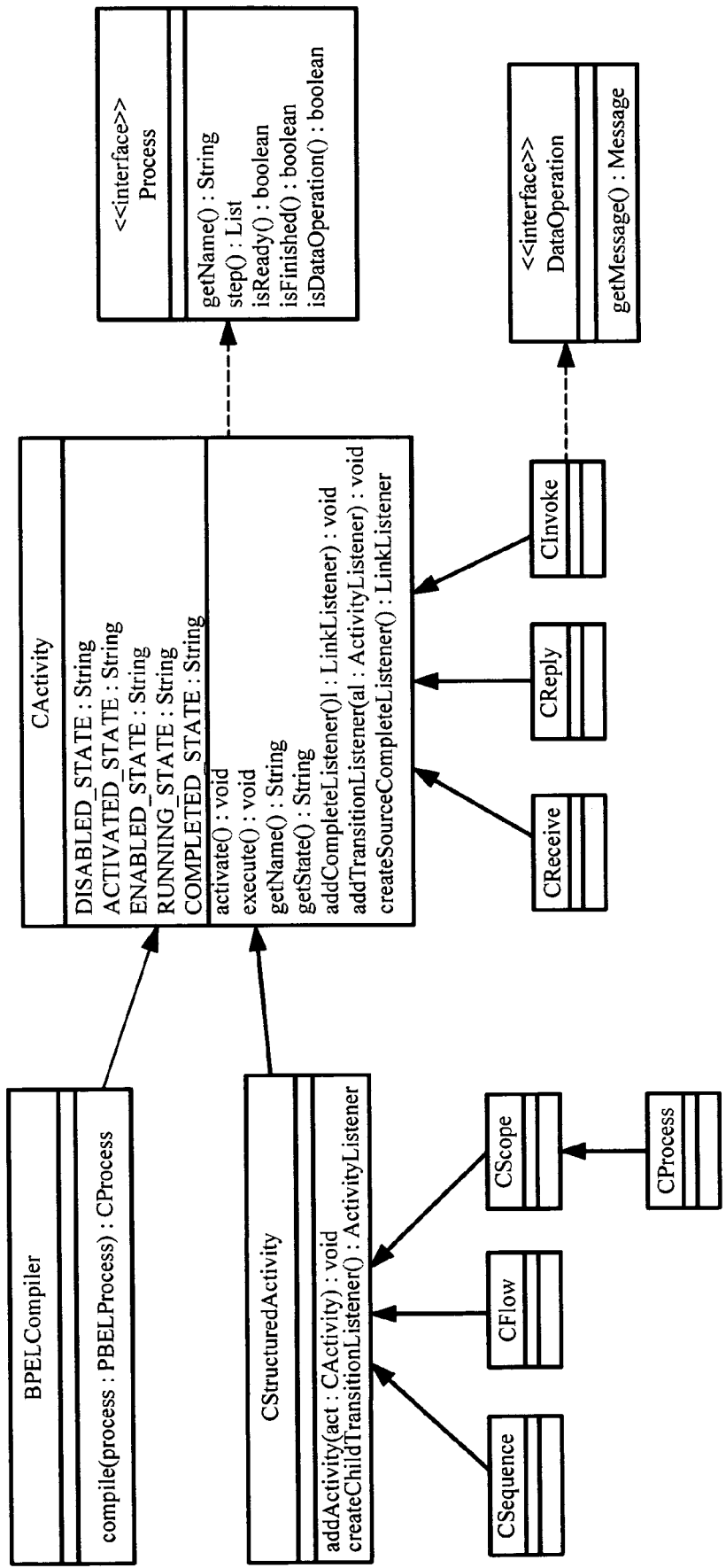
FIG. 20 illustrates a BPEL compiler and EOM in accordance with one embodiment of the present invention.

FIG. 20 is an example of a BPEL compiler that operates on a BPEL DOM instances and produces Cprocess executable EOMs. The Cprocess is a single, unique instance of an executable process that can be executed within/on the execution engine/virtual processor. The CActivit is the top level object in the EOM hierarchy.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

APPENDIX I

Glossary and URLs of Selected Documents

1. Execution Object Model: (EOM) A compiled BPEL DOM that may be executed.
2. Document Object Model: (DOM) Object representation of BPEL Document.
3. Axis: Apache implementation of SOAP.
4. Business Process Execution Language (BPEL): Specification for orchestrating a process flow with Web Services.
5. Web Services Invocation Framework (WSIF): Apache API for invoking Web Services regardless of how or where the services are provided.
6. Web Services Description Language (WSDL): XML format for describing network services (Web Services).
7. Activity: Single unit of a BPEL Process. Examples are Invoke, Receive and Reply.
8. Step: Single unit of Process execution.
9. Process: Depending on context, a Process may be an executable object managed by a Processor, a flow defined by a BPEL document, or the Web Service provided by the BPEL document definition.
10. Business Process Execution Language For Web Services (BPEL4WS) Specification, Version 1.0. http://www-106.ibm.com/developerworks/webservices/library/ws-bpel
11. Web Services Description Language (WSDL) 1.1. http://www.w3.org/TR/wsdl
12. Web Services Invocation Framework (WSIF) 2.0. http://ws.apache.org/wsif
13. Apache Axis 1.0 http://ws.apache.org/axis/index.html
14. WSDL—Web Services Description Language
15. BPEL4WS—Business Process Execution Language for Web Services
16. XML—eXtensible Markup Language
17. XSLT—eXtensible Stylesheet Language Transformation
18. DOM—Document Object Model
19. NBNE—Non Browser Navigation and Extraction
20. Business Process Execution Language for Web Services (BPEL4WS) specification
21. Web Services Description Language (WSDL) 1.1
22. XML Specification 1.0
23. XSD Schema Specification 1.0

What is claimed is:

1. An apparatus for publishing streaming data, comprising:
a server including:
a web enabled messaging service;
a publisher interface configured to allow publishers to publish streaming data via said messaging service;
a subscriber interface configured to allow subscribers to listen to streaming data via said messaging service;
wherein real time streaming data from at least one streaming data source is provided via messaging service messages;
a data warehouse for storing streaming data updates;
a spread sheet based client manager configured to communicate with one or more spreadsheet based clients, said client manager having a publisher interface to publish data and a subscriber interface for subscribing to data, wherein said client manager is configured to subscribe to streaming data and publish streaming data via said messaging service;
at least one spreadsheet based client configured to receive streaming data from said client manager and to publish streaming data via said client manager using a database function in said spreadsheet based client; and
a stream manager configured to allow client to change stream configuration and to querying content of streaming data.

2. A method of generating streaming data, comprising:
providing a messaging service having a publisher interface for publishers to publish streaming data via said messaging service and a subscriber interface for subscribers to listen to streaming data via said messaging service;
providing a spread sheet based client manager having a publisher interface for publishers to publish streaming data via said messaging service and a subscriber interface for subscribers to listen to streaming data via said messaging service, wherein said client manager is configured to communicate with one or more spreadsheet based clients;
receiving streaming data in the publisher interface of said messaging service;
processing said streaming data to generate web enabled messages describing real time data updates;
providing said messages to said client manager;
providing by said client manager said streaming data to a spreadsheet based client, wherein said spreadsheet based client is configured to receive streaming data from said client manager and to publish streaming data via said client manager using a database function in said spreadsheet based client;
storing streaming data to a database; and
providing a stream manager configured to allow client to change stream configuration and to querying content of streaming data.

* * * * *

UNITED STATES PATENT AND TRADEMARK OFFICE
CERTIFICATE OF CORRECTION

PATENT NO. : 8,352,423 B2
APPLICATION NO. : 10/841216
DATED : January 8, 2013
INVENTOR(S) : Mark Phillips et al.

Page 1 of 1

It is certified that error appears in the above-identified patent and that said Letters Patent is hereby corrected as shown below:

In the claims: In col. 20 line 21, "allow client" should read "allow a client"; in col. 20 line 22, "to querying" should read "to query"; in col. 20 line 48, "allow client" should read "allow a client"; in col. 20 line 49, "to querying" should read "to query".

Signed and Sealed this
Ninth Day of April, 2013

Teresa Stanek Rea
*Acting Director of the United States Patent and Trademark Office*